(12) United States Patent
Burcham et al.

(10) Patent No.: US 10,410,241 B1
(45) Date of Patent: Sep. 10, 2019

(54) SWIPE SCREEN ADVERTISEMENT METRICS AND TRACKING

(71) Applicant: Sprint Communications Company L.P., Overland Park, KS (US)

(72) Inventors: Robert H. Burcham, Overland Park, KS (US); Jason R. Delker, Olathe, KS (US); Geoffrey A. Holmes, Olathe, KS (US); M. Jeffrey Stone, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 550 days.

(21) Appl. No.: 14/165,569

(22) Filed: Jan. 27, 2014

Related U.S. Application Data

(60) Provisional application No. 61/910,001, filed on Nov. 27, 2013, provisional application No. 61/910,002, filed on Nov. 27, 2013.

(51) Int. Cl.
*G06Q 30/02* (2012.01)
*G06F 3/0482* (2013.01)
*G06F 3/0488* (2013.01)

(52) U.S. Cl.
CPC ....... *G06Q 30/0242* (2013.01); *G06F 3/0482* (2013.01); *G06F 3/0488* (2013.01)

(58) Field of Classification Search
CPC ............... G06Q 30/02; G06Q 30/0277; G06Q 30/0267; G06Q 30/0241; G06Q 30/0242; G06Q 30/0276; G06Q 30/0256; G06Q 30/0257
USPC ........................................................ 705/14
See application file for complete search history.

(56) References Cited

U.S. PATENT DOCUMENTS

| | | | |
|---|---|---|---|
| 5,636,346 A | 6/1997 | Saxe | |
| 5,761,648 A | 6/1998 | Golden et al. | |
| 5,848,396 A | 12/1998 | Gerace | |
| 5,848,397 A | 12/1998 | Marsh et al. | |
| 5,918,014 A | 6/1999 | Robinson | |
| 5,918,041 A | 6/1999 | Berstis | |
| 5,933,811 A | 8/1999 | Angles et al. | |

(Continued)

FOREIGN PATENT DOCUMENTS

| | | |
|---|---|---|
| WO | WO03044703 A1 | 5/2003 |
| WO | WO2012093396 A1 | 7/2012 |
| WO | WO2015038562 A1 | 3/2015 |

OTHER PUBLICATIONS

Mantyjarvi, Jani et al, Enabling fast and effortless customisation in accelerometer based gesture interaction, MUM 2004 Proceedings, pp. 25-31. (Year: 2004).*

(Continued)

*Primary Examiner* — Katherine Kolosowski-Gager

(57) ABSTRACT

A method of measuring ad performance on a mobile device comprises presenting a swipe screen on a mobile device, displaying an ad on the swipe screen on the mobile device, receiving, by one or more input devices on the mobile device, one or more inputs, tracking the one or more inputs as interactions with the ad on the swipe screen, generating an interaction report based on the one or more inputs, and sending the interaction report to a server. The ad is configured to accept a range of inputs corresponding to interactions with the ad when displayed on the swipe screen, and the one or more inputs correspond to an interaction with the ad.

18 Claims, 9 Drawing Sheets

(56) References Cited

U.S. PATENT DOCUMENTS

| | | |
|---|---|---|
| 5,937,392 A | 8/1999 | Alberts |
| 5,974,398 A | 10/1999 | Hanson et al. |
| 6,202,023 B1 | 3/2001 | Hancock et al. |
| 6,233,566 B1 | 5/2001 | Levine et al. |
| 6,266,649 B1 | 7/2001 | Linden et al. |
| 6,286,005 B1 | 9/2001 | Cannon |
| 6,317,722 B1 | 11/2001 | Jacobi et al. |
| 6,321,983 B1 | 11/2001 | Katayanagi et al. |
| 6,332,127 B1 | 12/2001 | Bandera et al. |
| 6,826,575 B1 | 11/2004 | Waclawski |
| 6,834,266 B2 | 12/2004 | Kumar et al. |
| 6,839,680 B1 | 1/2005 | Liu et al. |
| 6,853,982 B2 | 2/2005 | Smith et al. |
| 6,910,017 B1 | 6/2005 | Woo et al. |
| 6,963,867 B2 | 11/2005 | Ford et al. |
| 6,966,536 B2 | 11/2005 | Enomoto et al. |
| 6,990,462 B1 | 1/2006 | Wilcox et al. |
| 7,022,905 B1 | 4/2006 | Hinman et al. |
| 7,065,532 B2 | 6/2006 | Elder et al. |
| 7,096,194 B2 | 8/2006 | Johnson |
| 7,127,313 B2 | 10/2006 | Neri |
| 7,143,143 B1 | 11/2006 | Thompson |
| 7,251,615 B2 | 7/2007 | Woo |
| 7,284,033 B2 | 10/2007 | Jhanji |
| 7,353,267 B1 | 4/2008 | Cunningham et al. |
| 7,406,436 B1 | 7/2008 | Reisman |
| 7,437,308 B2 | 10/2008 | Kumar et al. |
| 7,481,367 B2 | 1/2009 | Fees et al. |
| 7,647,258 B2 | 1/2010 | William et al. |
| 7,676,394 B2 | 3/2010 | Ramer et al. |
| 7,680,899 B1 | 3/2010 | Barnes et al. |
| 7,698,335 B1 | 4/2010 | Vronay |
| 7,788,644 B2 | 8/2010 | Koduru et al. |
| 7,801,518 B1 | 9/2010 | Urbanek |
| 7,840,498 B2 | 11/2010 | Frank et al. |
| 7,958,005 B2 | 6/2011 | Dangaltchev |
| 7,974,616 B1 | 7/2011 | Urbanek |
| 8,214,454 B1 | 7/2012 | Barnes et al. |
| 8,326,673 B1 | 12/2012 | Biere et al. |
| 8,355,955 B1 | 1/2013 | Mirchandani et al. |
| 8,423,408 B1 | 4/2013 | Barnes et al. |
| 8,442,858 B1 | 5/2013 | Barnes et al. |
| 9,248,340 B2 * | 2/2016 | Hoffman ............... G01S 19/48 |
| 9,275,390 B1 | 3/2016 | Barnes et al. |
| 9,319,379 B1 | 4/2016 | Burcham et al. |
| 9,374,335 B2 | 6/2016 | Burcham et al. |
| 9,922,347 B1 | 3/2018 | Burcham et al. |
| 2001/0039500 A1 | 11/2001 | Johnson |
| 2001/0044743 A1 | 11/2001 | McKinley et al. |
| 2001/0047294 A1 | 11/2001 | Rothschild |
| 2002/0010627 A1 | 1/2002 | Lerat |
| 2002/0013727 A1 | 1/2002 | Lee |
| 2002/0026355 A1 | 2/2002 | Mitsuoka et al. |
| 2002/0026361 A1 | 2/2002 | Blom |
| 2002/0030100 A1 | 3/2002 | Katayanagi et al. |
| 2002/0032771 A1 | 3/2002 | Gledje |
| 2002/0035474 A1 | 3/2002 | Alpdemir |
| 2002/0059387 A1 | 5/2002 | Wolfe |
| 2002/0060246 A1 | 5/2002 | Gobburu et al. |
| 2002/0065713 A1 | 5/2002 | Awada et al. |
| 2002/0091569 A1 | 7/2002 | Kitaura et al. |
| 2002/0091571 A1 | 7/2002 | Thomas et al. |
| 2002/0095333 A1 | 7/2002 | Jokinen et al. |
| 2002/0107027 A1 | 8/2002 | O'Neil |
| 2002/0128904 A1 | 9/2002 | Carruthers et al. |
| 2002/0128908 A1 | 9/2002 | Levin et al. |
| 2002/0143630 A1 | 10/2002 | Steinman et al. |
| 2002/0152133 A1 | 10/2002 | King et al. |
| 2002/0165849 A1 | 11/2002 | Singh et al. |
| 2002/0184080 A1 | 12/2002 | Murad et al. |
| 2003/0004802 A1 | 1/2003 | Callegari |
| 2003/0004808 A1 | 1/2003 | Elhaoussine et al. |
| 2003/0007643 A1 | 1/2003 | Ben-Zur et al. |
| 2003/0018516 A1 | 1/2003 | Ayala et al. |
| 2003/0018558 A1 | 1/2003 | Heffner et al. |
| 2003/0023482 A1 | 1/2003 | Messner et al. |
| 2003/0028451 A1 | 2/2003 | Ananian |
| 2003/0032409 A1 | 2/2003 | Hutcheson et al. |
| 2003/0050863 A1 | 3/2003 | Radwin |
| 2003/0074251 A1 | 4/2003 | Kumar et al. |
| 2003/0074259 A1 | 4/2003 | Slyman, Jr. et al. |
| 2003/0101024 A1 | 5/2003 | Adar et al. |
| 2003/0101449 A1 | 5/2003 | Bentolila et al. |
| 2003/0126250 A1 | 7/2003 | Jhanji |
| 2003/0171962 A1 | 9/2003 | Hirth et al. |
| 2003/0172007 A1 | 9/2003 | Helmolt et al. |
| 2003/0229502 A1 | 12/2003 | Woo |
| 2004/0019540 A1 | 1/2004 | William et al. |
| 2004/0019541 A1 | 1/2004 | William et al. |
| 2004/0111315 A1 | 6/2004 | Sharma et al. |
| 2004/0148628 A1 * | 7/2004 | Mears ............... H04N 5/44543 725/43 |
| 2004/0194052 A1 | 9/2004 | Hoffschulz et al. |
| 2005/0021403 A1 | 1/2005 | Ozer et al. |
| 2005/0028188 A1 | 2/2005 | Latona et al. |
| 2005/0078660 A1 | 4/2005 | Wood |
| 2005/0101332 A1 | 5/2005 | Kotzin |
| 2005/0102272 A1 | 5/2005 | Kumar et al. |
| 2005/0114829 A1 | 5/2005 | Robin et al. |
| 2005/0177419 A1 | 8/2005 | Choi et al. |
| 2005/0193036 A1 | 9/2005 | Phillips et al. |
| 2005/0194431 A1 | 9/2005 | Fees et al. |
| 2005/0197887 A1 | 9/2005 | Zuerl et al. |
| 2005/0197918 A1 | 9/2005 | Wittmer et al. |
| 2005/0215238 A1 | 9/2005 | Macaluso |
| 2005/0228754 A1 | 10/2005 | Pezzaniti et al. |
| 2005/0245246 A1 | 11/2005 | Munch et al. |
| 2005/0246394 A1 | 11/2005 | Neri |
| 2005/0256759 A1 | 11/2005 | Acharya et al. |
| 2005/0278296 A1 | 12/2005 | Bostwick |
| 2006/0020513 A1 * | 1/2006 | Nagano ............... G06Q 30/02 705/14.4 |
| 2006/0074769 A1 | 4/2006 | Looney et al. |
| 2006/0080135 A1 | 4/2006 | Frank et al. |
| 2006/0080171 A1 | 4/2006 | Jardins et al. |
| 2006/0085253 A1 | 4/2006 | Mengerink et al. |
| 2006/0085517 A1 | 4/2006 | Kaurila |
| 2006/0141428 A1 | 6/2006 | Herrod et al. |
| 2006/0178932 A1 | 8/2006 | Lang |
| 2006/0212350 A1 | 9/2006 | Ellis et al. |
| 2006/0223495 A1 | 10/2006 | Cassett et al. |
| 2006/0224437 A1 | 10/2006 | Gupta et al. |
| 2007/0005647 A1 | 1/2007 | Cugi et al. |
| 2007/0022009 A1 | 1/2007 | Cataldi et al. |
| 2007/0026871 A1 | 2/2007 | Wager |
| 2007/0060099 A1 | 3/2007 | Ramer et al. |
| 2007/0061229 A1 | 3/2007 | Ramer et al. |
| 2007/0094042 A1 | 4/2007 | Ramer et al. |
| 2007/0100963 A1 | 5/2007 | Ban et al. |
| 2007/0106520 A1 | 5/2007 | Akkiraju et al. |
| 2007/0130005 A1 | 6/2007 | Jaschke |
| 2007/0192715 A1 | 8/2007 | Kataria et al. |
| 2007/0198339 A1 | 8/2007 | Shen et al. |
| 2007/0208619 A1 | 9/2007 | Branam et al. |
| 2007/0239518 A1 | 10/2007 | Chung et al. |
| 2007/0244750 A1 | 10/2007 | Grannan et al. |
| 2008/0004884 A1 | 1/2008 | Flake et al. |
| 2008/0010137 A1 | 1/2008 | Ho et al. |
| 2008/0040175 A1 * | 2/2008 | Dellovo ............ G06Q 10/0637 705/7.36 |
| 2008/0065476 A1 | 3/2008 | Klein et al. |
| 2008/0082412 A1 | 4/2008 | Tallyn et al. |
| 2008/0097851 A1 | 4/2008 | Bemmel et al. |
| 2008/0104637 A1 | 5/2008 | Rodriguez et al. |
| 2008/0120565 A1 | 5/2008 | Stiso et al. |
| 2008/0126515 A1 | 5/2008 | Chambers et al. |
| 2008/0140476 A1 | 6/2008 | Anand et al. |
| 2008/0147478 A1 | 6/2008 | Mall et al. |
| 2008/0228583 A1 | 9/2008 | MacDonald et al. |
| 2009/0029721 A1 | 1/2009 | Doraswamy |
| 2009/0048977 A1 | 2/2009 | Aggarwal et al. |
| 2009/0070129 A1 | 3/2009 | Inbar et al. |
| 2009/0076899 A1 | 3/2009 | Gbodimowo |
| 2009/0150215 A1 | 6/2009 | Kalb et al. |

(56) References Cited

U.S. PATENT DOCUMENTS

| | | |
|---|---|---|
| 2009/0157512 A1 | 6/2009 | King |
| 2009/0198580 A1 | 8/2009 | Broberg et al. |
| 2009/0222329 A1 | 9/2009 | Ramer et al. |
| 2009/0234912 A1* | 9/2009 | Perrine .................. H04L 67/06 709/203 |
| 2009/0256858 A1 | 10/2009 | Ogikubo et al. |
| 2009/0265245 A1 | 10/2009 | Wright |
| 2009/0271255 A1 | 10/2009 | Utter et al. |
| 2009/0292608 A1 | 11/2009 | Polachek |
| 2010/0042499 A1 | 2/2010 | Barton |
| 2010/0082422 A1 | 4/2010 | Heilig et al. |
| 2010/0082429 A1 | 4/2010 | Samdadiya et al. |
| 2010/0119111 A1 | 5/2010 | Helfman et al. |
| 2010/0222035 A1 | 9/2010 | Robertson et al. |
| 2010/0228592 A1 | 9/2010 | Anderson et al. |
| 2010/0254525 A1* | 10/2010 | Maly ...................... H04M 1/67 379/207.03 |
| 2011/0039602 A1* | 2/2011 | McNamara ............. G06F 3/017 455/566 |
| 2011/0082939 A1 | 4/2011 | Montemurro et al. |
| 2011/0131109 A1 | 6/2011 | Pappas et al. |
| 2011/0246890 A1 | 10/2011 | Mellamphy et al. |
| 2011/0258049 A1 | 10/2011 | Ramer et al. |
| 2011/0270687 A1 | 11/2011 | Bazaz |
| 2011/0288913 A1* | 11/2011 | Waylonis ............... G06Q 30/02 705/14.4 |
| 2011/0288931 A1* | 11/2011 | Kuhn ................ G06F 17/30864 705/14.49 |
| 2012/0062473 A1 | 3/2012 | Xiao et al. |
| 2012/0072271 A1 | 3/2012 | Dessert et al. |
| 2012/0123830 A1 | 5/2012 | Svendsen et al. |
| 2012/0170521 A1 | 7/2012 | Vogedes et al. |
| 2012/0179536 A1 | 7/2012 | Kalb et al. |
| 2012/0215911 A1 | 8/2012 | Raleigh et al. |
| 2013/0006743 A1 | 1/2013 | Moore et al. |
| 2013/0018714 A1 | 1/2013 | George |
| 2013/0060631 A1* | 3/2013 | Corson .............. G06Q 30/0241 705/14.46 |
| 2013/0211925 A1 | 8/2013 | Holland |
| 2013/0211941 A1 | 8/2013 | Hallowell et al. |
| 2013/0304586 A1 | 11/2013 | Angles et al. |
| 2013/0311293 A1 | 11/2013 | Ward et al. |
| 2013/0331027 A1 | 12/2013 | Rose et al. |
| 2014/0040035 A1 | 2/2014 | Cusack |
| 2014/0059141 A1 | 2/2014 | Belkin et al. |
| 2014/0066029 A1 | 3/2014 | Brennan et al. |
| 2014/0080467 A1 | 3/2014 | Urbanek |
| 2014/0089113 A1 | 3/2014 | Desai et al. |
| 2014/0136314 A1* | 5/2014 | Kiet ................... G06Q 30/0242 705/14.41 |
| 2014/0195352 A1* | 7/2014 | Govan ............... G06Q 30/0267 705/14.59 |
| 2014/0278953 A1 | 9/2014 | Ismail et al. |
| 2014/0379448 A1 | 12/2014 | Gregory |
| 2014/0379467 A1* | 12/2014 | Huang ................ G06Q 30/0281 705/14.53 |
| 2015/0074204 A1 | 3/2015 | Burcham et al. |
| 2015/0121418 A1 | 4/2015 | Jain et al. |

OTHER PUBLICATIONS

Google Developer Android, "Advertising ID," http://developer.android.com/google/play-services/id.html, Apr. 3, 2014, last accessed Feb. 10, 2015.

Wikipedia, "Real-time Bidding," http://en.wikipedia.org/wiki/Real-time_bidding, Apr. 3, 2014, last accessed Feb. 10, 2015.

Reynolds, Kevin, "Are Ad Exchanges and Real Time Bidding the Next Big Thing?," http://www.advertisingperspectives.com/adblog/media-activation/are-ad-exchanges-and-real-time-bidding-the-next-big-thing/, Apr. 3, 2014, last accessed Feb. 10, 2015.

Foreign Communication from a Related Counterpart—International Search Report and Written Opinion, dated Dec. 24, 2014, PCT/US14/54877, filed on Nov. 11, 2014.

Foreign Communication from a Related Counterpart—Preliminary Report on Patentability dated Mar. 24, 2016, PCT/US14/54877, filed on Sep. 10, 2014.

Thierer, et al., "Privacy Solutions (Part 2): Adblock Plus," Technology Liberation Front, Sep. 8, 2008, on line at techliberation.com.

Wikipedia, "Foursuare," https://en.wikipedia.org/w/index.php?title=Foursquare&oldid=681836736, Mar. 2009, last accessed on Sep. 25, 2015.

Barnes, James D., et al., entitled, "In-Flight Campaign Optimization," filed Nov. 9, 2006, U.S. Appl. No. 11/558,021.

Barnes, James D., et al., entitled "Mobile-Device-Based Coupon Management Systems and Methods," filed Apr. 13, 2006, U.S. Appl. No. 11/403,614.

Barnes, James D., et al., entitled, "Inventory Management Integrating Subscriber and Targeting Data," Jun. 26, 2006, U.S. Appl. No. 11/474,880.

Barnes, James D., et al., entitled, "Behavioral Analysis Engine for Profiling Wireless Subscribers," filed Nov. 8, 2006, U.S. Appl. No. 11/557,939.

Barnes, James D., et al., entitled, "Advertisement Inventory Management," filed Oct. 27, 2008, U.S. Appl. No. 12/259,187.

Martin, Geoff S., et al., entitled, "Method and System for Providing Custom Background-Downloads," filed Nov. 16, 2007, U.S. Appl. No. 11/280,576.

McConnell, Von K. et al., entitled, "Method and System Using Location History for Targeted Coupon Distribution," filed May 17, 2000, U.S. Appl. No. 09/572,282.

Weaver, Farni, et al., "Method and System for Facilitating Determination of Call-Drop Locations in a Wireless Network," filed Sep. 9, 2003, U.S. Appl. No. 10/658,353.

Burcham, Robert H., et al., entitled "System and Method for Identifying a Mobile Device with Near Real Time Visualization to Action," filed Sep. 11, 2013, U.S. Appl. No. 14/024,627.

Burcham, Robert H., et al., entitled "Methods and Systems of Generating a Unique Mobile Device Identifier," filed Aug. 1, 2013, U.S. Appl. No. 13/956,367.

Holmes, Geoffrey A., entitled "Methods and Systems of Collecting and Segmenting Device Sensor Data for Mobile Device Identification," filed Jun. 5, 2013, U.S. Appl. No. 13/911,074.

Belser, John E., et al., entitled "Ad Management Using Ads Cached on a Mobile Electronic Device," filed Jan. 9, 2014, U.S. Appl. No. 14/150,832.

Burcham, Robert H., et al., entitled "IP Address Hashing in Advertisement Gateway," filed on Jan. 21, 2014, U.S. Appl. No. 14/160,196.

Burcham, Robert H., et al., entitled "Client Mediation and Integration to Advertisement Gateway," filed on Jan. 21, 2014, U.S. Appl. No. 14/160,206.

Burcham, Robert H., et al., entitled "Address Modification for Advertisement Mediation," filed on Jan. 21, 2014, U.S. Appl. No. 14/160,215.

Burcham, Robert H., et al., entitled "Advertisement Mediation of Supply-Demand Communications," filed on Jan. 21, 2014, U.S. Appl. No. 14/160,224.

Katzer, Robin D., et al., entitled "Advertisement Dynamic Queue Management," filed Apr. 10, 2014, U.S. Appl. No. 14/250,381.

Hannebaum, Ryan K., et al., entitled, "Advertisement Campaign Target Selection Engine," filed Apr. 4, 2014, U.S. Appl. No. 14/245,822.

Belser, John E., et al., entitled "End User Participation in Mobile Advertisement," filed Sep. 24, 2014, U.S. Appl. No. 14/494,601.

Delker, Jason R., et al., entitled "Swipe Screen Advertisement Metrics and Tracking," filed on Nov. 27, 2013, U.S. Appl. No. 61/910,001.

Delker, Jason R., et al., entitled "Ad Management Using Ads Cached on a Mobile Electronic Device," filed on Nov. 27, 2013, U.S. Appl. No. 61/910,002.

Burcham, Robert H., et al., entitled "Ad Management Using Ads Cached on a Mobile Electronic Device," filed on Jan. 28, 2014, U.S. Appl. No. 14/165,571.

Burcham, Robert H., et al., entitled "Categorization of Unknown Variables in a Target Information Database," filed Nov. 4, 2014, U.S. Appl. No. 14/532,969.

(56) References Cited

OTHER PUBLICATIONS

Bell, Timothy L., et al., entitled "Method for Consumer Profile Consolidation Using Mobile Network Identification," filed Oct. 20, 2014, U.S. Appl. No. 14/518,504.
Arivukkarasu, Anand, et al., entitled "Telecom Services to Support Retail Fuel Stocking Logistics," filed Nov. 12, 2014, U.S. Appl. No. 14/539,715.
Delker, Jason R., et al., entitled, "Enhanced Dialer for a Mobile Communication Device," filed Mar. 4, 2015, U.S. Appl. No. 14/639,057.
Ferrante, Piero D., et al., entitled, "System and Method for Subscriber Cluster Synthesis," filed Feb. 11, 2015, U.S. Appl. No. 14/619,689.
Office Action—Restriction requirement dated Jun. 17, 2008, U.S. Appl. No. 11/405,195, filed Apr. 17, 2006, 7 pages.
Office Action dated Aug. 15, 2008, U.S. Appl. No. 11/405,195, filed Apr. 17, 2006, 12 pages.
Final Office Action dated Feb. 26, 2009, U.S. Appl. No. 11/405,195, 17 pages.
Advisory Action dated May 7, 2009, U.S. Appl. No. 11/405,195, 2 pages.
Office Action dated Aug. 18, 2009, U.S. Appl. No. 11/405,195, 17 pages.
Final Office Action dated Oct. 27, 2010, U.S. Appl. No. 11/405,195, filed Apr. 17, 2006.
Office Action dated Feb. 8, 2011, U.S. Appl. No. 11/405,195, filed Apr. 17, 2006.
Final Office Action dated Jul. 22, 2011, U.S. Appl. No. 11/405,195, filed Apr. 17, 2006.
Office Action dated Apr. 6, 2012, U.S. Appl. No. 11/405,195, filed Apr. 17, 2006.
Notice of Allowance dated Dec. 6, 2012, U.S. Appl. No. 11/405,195, filed Apr. 17, 2006.
Office Action dated Feb. 27, 2009, U.S. Appl. No. 11/433,301, filed May 12, 2006, 13 pages.
Notice of Allowance dated Oct. 26, 2009, U.S. Appl. No. 11/433,301, filed May 12, 2006, 7 pages.
Office Action dated Jun. 17, 2008, U.S. Appl. No. 11/403,614, filed Apr. 13, 2006, 7 pages.
Office Action dated Aug. 27, 2008, U.S. Appl. No. 11/403,614, filed Apr. 13, 2006, 11 pages.
Final Office Action dated Mar. 4, 2009, U.S. Appl. No. 11/403,614, filed Apr. 13, 2006, 12 pages.
Advisory Action dated May 7, 2009, U.S. Appl. No. 11/403,614, filed Apr. 13, 2006, 3 pages.
Office Action dated Aug. 20, 2009, U.S. Appl. No. 11/403,614, filed Apr. 13, 2006, 11 pages.
Final Office Action dated Nov. 8, 2010, U.S. Appl. No. 11/403,614, filed Apr. 13, 2006.
Office Action dated Dec. 3, 2012, U.S. Appl. No. 11/403,614, filed Apr. 13, 2006.
Final Office Action dated Jun. 10, 2013, U.S. Appl. No. 11/403,614, filed Apr. 13, 2006.
Advisory Action dated Aug. 22, 2013, U.S. Appl. No. 11/403,614, filed Apr. 13, 2006.
Office Action dated Nov. 3, 2008, U.S. Appl. No. 11/438,540, filed May 22, 2006, 14 pages.
Final Office Action dated Apr. 28, 2009, U.S. Appl. No. 11/438,540, filed May 22, 2006, 16 pages.
Advisory Action dated Jul. 10, 2009, U.S. Appl. No. 11/438,540, filed May 22, 2006, 3 pages.
Office Action dated Oct. 16, 2009, U.S. Appl. No. 11/438,540, filed May 22, 2006, 12 pages.
Final Office Action dated Apr. 20, 2010, U.S. Appl. No. 11/438,540, filed May 22, 2006, 26 pages.
Advisory Action dated Jul. 2, 2010, U.S. Appl. No. 11/438,540, filed May 22, 2006, 4 pages.
Office Action dated Oct. 14, 2010, U.S. Appl. No. 11/438,540, filed May 22, 2006.
Final Office Action dated Mar. 30, 2011, U.S. Appl. No. 11/438,540, filed May 22, 2006.
Examiner's Answer dated Oct. 27, 2011, U.S. Appl. No. 11/438,540, filed May 22, 2006.
Decision on Appeal dated Apr. 28, 2015, U.S. Appl. No. 11/438,540, filed May 22, 2006.
Notice of Allowance dated Jul. 16, 2015, U.S. Appl. No. 11/438,540, filed May 22, 2006.
Office Action dated Nov. 14, 2008, U.S. Appl. No. 11/474,880, filed Jun. 26, 2006, 17 pages.
Final Office Action dated May 28, 2009, U.S. Appl. No. 11/474,880, filed Jun. 26, 2006, 23 pages.
Advisory Action dated Oct. 19, 2009, U.S. Appl. No. 11/474,880, filed Jun. 26, 2006, 4 pages.
Advisory Action (corrected) dated Oct. 27, 2009, U.S. Appl. No. 11/474,880, filed Jun. 26, 2006, 4 pages.
Office Action dated Mar. 5, 2010, U.S. Appl. No. 11/474,880, filed Jun. 26, 2006, 24 pages.
Final Office Action dated Aug. 18, 2010, U.S. Appl. No. 11/474,880, filed Jun. 26, 2006, 20 pages.
Office Action dated Mar. 30, 2011, U.S. Appl. No. 11/474,880, filed Jun. 26, 2006.
Final Office Action dated Sep. 7, 2011, U.S. Appl. No. 11/474,880, filed Jun. 26, 2006.
Advisory Action dated Nov. 15, 2011, U.S. Appl. No. 11/474,880, filed Jun. 26, 2006.
Examiner's Answer dated May 1, 2012, U.S. Appl. No. 11/474,880, filed Jun. 26, 2006.
Decision on Appeal dated Nov. 18, 2014, U.S. Appl. No. 11/474,880, filed Jun. 26, 2006.
Office Action dated Feb. 25, 2015, U.S. Appl. No. 11/474,880, filed Jun. 26, 2006.
Final Office Action dated Aug. 31, 2015, U.S. Appl. No. 11/474,880, filed Jun. 26, 2006.
Advisory Action dated Oct. 29, 2015, U.S. Appl. No. 11/474,880, filed Jun. 26, 2006.
Supplemental Advisory Action dated Nov. 2, 2015, U.S. Appl. No. 11/474,880, filed Jun. 26, 2006.
Office Action dated Feb. 4, 2009, U.S. Appl. No. 11/491,387, filed Jul. 21, 2006, 9 pages.
Final Office Action dated Aug. 6, 2009, U.S. Appl. No. 11/491,387, filed Jul. 21, 2006, 13 pages.
Advisory Action dated Oct. 19, 2009, U.S. Appl. No. 11/491,387, filed Jul. 21, 2006, 4 pages.
Examiner's Answer dated Nov. 8, 2010, U.S. Appl. No. 11/491,387, filed Jul. 21, 2006.
Decision on Appeal dated Oct. 9, 2012, U.S. Appl. No. 11/491,387, filed Jul. 21, 2006.
Notice of Allowance dated Jan. 8, 2013, U.S. Appl. No. 11/491,387, filed Jul. 21, 2006.
Office Action dated Jan. 6, 2010, U.S. Appl. No. 11/558,021, filed Nov. 9, 2006, 7 pages.
Final Office Action dated Jun. 29, 2010, U.S. Appl. No. 11/558,021, filed Nov. 9, 2006, 28 pages.
Advisory Action dated Sep. 22, 2010, U.S. Appl. No. 11/558,021, filed Nov. 9, 2006, 3 pages.
Office Action dated Jun. 13, 2013, U.S. Appl. No. 11/558,021, filed Nov. 9, 2006.
Final Office Action dated Dec. 26, 2013, U.S. Appl. No. 11/558,021, filed Nov. 9, 2006.
Advisory Action dated Feb. 20, 2014, U.S. Appl. No. 11/558,021, filed Nov. 9, 2006, 3 pages.
Examiner's Answer date Aug. 26, 2014, U.S. Appl. No. 11/558,021, filed Nov. 9, 2006.
Office Action dated Aug. 30, 2010, U.S. Appl. No. 11/557,939, filed Nov. 8, 2006, 52 pages.
Final Office Action dated Jan. 13, 2011, U.S. Appl. No. 11/557,939, filed Nov. 8, 2006.
Advisory Action dated Mar. 22, 2011, U.S. Appl. No. 11/557,939, filed Nov. 8, 2006.
Office Action dated Oct. 31, 2013, U.S. Appl. No. 11/557,939, filed Nov. 8, 2006.
Office Action dated Aug. 5, 2014, U.S. Appl. No. 11/557,939, filed Nov. 8, 2006.

(56) References Cited

OTHER PUBLICATIONS

Final Office Action dated Mar. 2, 2015, U.S. Appl. No. 11/557,939, filed Nov. 8, 2006.
Advisory Action dated May 18, 2015, U.S. Appl. No. 11/557,939, filed Nov. 8, 2006.
Office Action dated Dec. 17, 2015, U.S. Appl. No. 11/557,939, filed Nov. 8, 2006.
Office Action dated Sep. 30, 2010, U.S. Appl. No. 11/617,703, filed Dec. 28, 2006.
Final Office Action dated Mar. 25, 2011, U.S. Appl. No. 11/617,703, filed Dec. 28, 2006.
Advisory Action dated Jun. 7, 2011, U.S. Appl. No. 11/617,703, filed Dec. 28, 2006.
Notice of Allowance dated Aug. 1, 2012, U.S. Appl. No. 11/617,703, filed Dec. 28, 2006.
Office Action dated Jul. 21, 2011, U.S. Appl. No. 12/259,187, filed Oct. 27, 2008.
Final Office Action dated Dec. 12, 2011, U.S. Appl. No. 12/259,187, filed Oct. 27, 2008.
Advisory Action dated Feb. 29, 2012, U.S. Appl. No. 12/259,187, filed Oct. 27, 2008.
Office Action dated Dec. 6, 2013, U.S. Appl. No. 12/259,187, filed Oct. 27, 2008.
Final Office Action dated May 27, 2014, U.S. Appl. No. 12/259,187, filed Oct. 27, 2008.
Advisory Action dated Aug. 6, 2014, U.S. Appl. No. 12/259,187, filed Oct. 27, 2008.
Examiner's Answer dated Mar. 12, 2015, U.S. Appl. No. 12/259,187, filed Oct. 27, 2008.
FAIPP Pre-Interview Communication dated Nov. 18, 2015, U.S. Appl. No. 14/024,629, filed Sep. 11, 2013.
Notice of Allowance dated Jan. 28, 2016, U.S. Appl. No. 14/024,629, filed Sep. 11, 2013.
FAIPP Pre-Interview Communication dated Sep. 23, 2015, U.S. Appl. No. 13/956,367, filed Aug. 1, 2013.
Notice of Allowance dated Dec. 16, 2015, U.S. Appl. No. 13/956,367, filed Aug. 1, 2013.
FAIPP Pre-Interview Communication dated Apr. 15, 2016, U.S. Appl. No. 13/911,074, filed Jun. 5, 2013.
FAIPP Pre-Interview Communication dated Apr. 3, 2015, U.S. Appl. No. 14/150,832, filed Jan. 9, 2014.
FAIPP Office Action dated Jul. 2, 2015, U.S. Appl. No. 14/150,832, filed Jan. 9, 2014.
Final Office Action dated Oct. 29, 2015, U.S. Appl. No. 14/150,832, filed Jan. 9, 2014.
Advisory Action dated Jan. 7, 2016, U.S. Appl. No. 14/150,832, filed Jan. 9, 2014.
FAIPP Pre-Interview Communication dated Feb. 16, 2016, U.S. Appl. No. 14/245,822, filed Apr. 4, 2014.
FAIPP Pre-Interview Communication dated Sep. 18, 2015, U.S. Appl. No. 14/494,601, filed Sep. 24, 2014.
First Action Interview Office Action dated Dec. 17, 2015, U.S. Appl. No. 14/494,601, filed Sep. 24, 2014.
Lightningcast, Inc., "Lightningcast Mobile Video Advertising Solution," May 2, 2005, 14 pgs.
Connelly, Francis J., et al., "The Life Cycle Concept as a Long Term Forecasting Model", Academy of Marketing Journal (pre-1986); pp. 455-464, Summer 1974, 2, 3, ABI/INFORM Global.
Fisher, Marshall, et al., Accurate Retail Testing of Fashion Merchandise: Methodology and Application, Marketing Science, vol. 19, No. 3, pp. 266-278, Summer 2000, ABI/INFORM Global.
Kurawarwala, Abbas A., et al., "Forecasting and Inventory Management of Short Life-Cycle Products", Operations Research, vol. 44, No. 1, Jan.-Feb. 1996, pp. 131-150, INFORMS.
Stratman, Scott, "Allstockedup", Industrial Distribution, vol. 89, No. 11, Nov. 2000, pp. 92-96, ABI/INFORM Global.
Vijayan, Jaikumar, "IBM Service Follows Products After Delivery", Computerworld, vol. 35, No. 28, p. 14, Jul. 9, 2001, ABI/INFORM Global.
Sterling, Greg, "Google Replacing "Android ID" with "Advertising ID" Similar to Apple's IDFA," http://marketingland.com/google-replacing-android-id-with-advertising-id-similar-to-apples-idfa-63636, posted Oct. 31, 2013.
Janssen, Cory, "Identifier for Advertisers (IFA)," http://www.techopedia.com/definition/29032/identifier-for-advertisers-ifa-ifda, Apr. 3, 2014, last accessed Feb. 10, 2015.
The iPhone Wiki, "UDID," http://theiphonewiki.com/wiki/UDID, Apr. 3, 2014, last accessed Feb. 10, 2015.
Final Office Action dated May 3, 2016, U.S. Appl. No. 11/557,939, filed Nov. 8, 2006.
Restriction Requirement dated May 19, 2016, U.S. Appl. No. 14/024,627, filed Sep. 11, 2013.
Office Action dated May 17, 2016, U.S. Appl. No. 14/150,832, filed Jan. 9, 2014.
First Action Interview Office Action dated Apr. 28, 2016, U.S. Appl. No. 14/245,822, filed Apr. 4, 2014.
Office Action dated Jul. 14, 2016, U.S. Appl. No. 14/165,571, filed Jan. 27, 2014.
Final Office Action dated Apr. 28, 2016, U.S. Appl. No. 14/494,601, filed Sep. 24, 2014.
Notice of Allowance dated Jul. 22, 2016, U.S. Appl. No. 14/494,601, filed Sep. 24, 2014.
Final Office Action dated Feb. 8, 2017, U.S. Appl. No. 14/165,571, filed Jan. 27, 2014.
Advisory Action dated Apr. 3, 2017, U.S. Appl. No. 14/165,571, filed Jan. 27, 2014.
Notice of Allowance dated Nov. 24, 2017, U.S. Appl. No. 14/165,571, filed Jan. 27, 2014.

\* cited by examiner

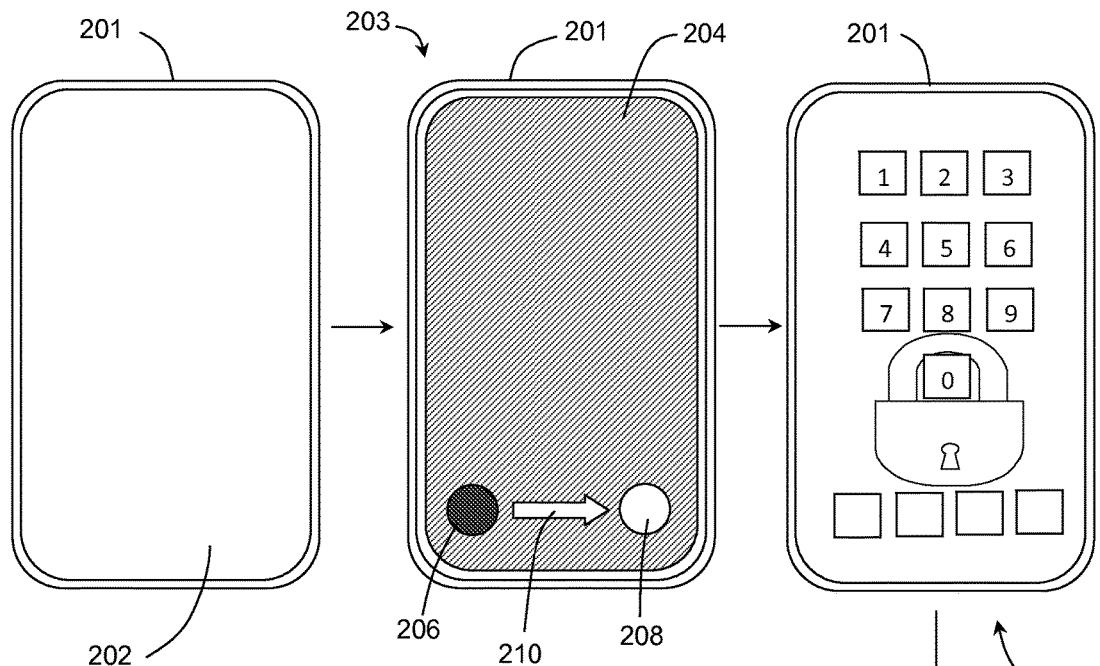
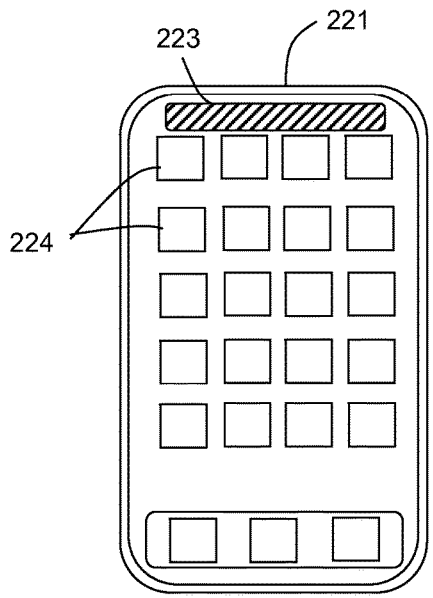
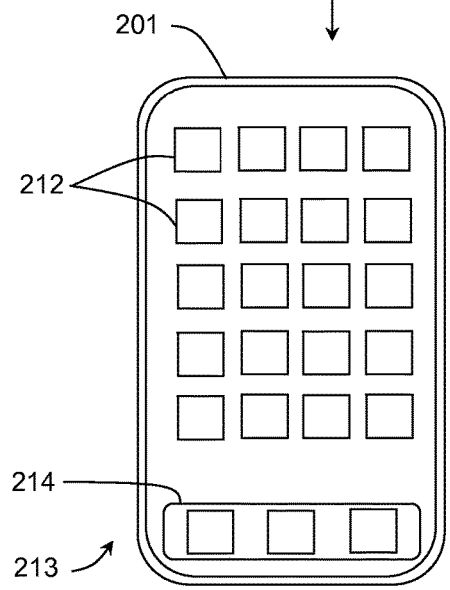

SWIPE SCREEN ADVERTISEMENT METRICS AND TRACKING

CROSS-REFERENCE TO RELATED APPLICATIONS

This application claims priority to and the benefit of U.S. Provisional Patent Application Ser. No. 61/910,001, filed Nov. 27, 2013, entitled "Swipe Screen Advertisement Metrics and Tracking," by Jason R. Delker, et al. and claims priority to and the benefit of U.S. Provisional Patent Application Ser. No. 61/910,002, filed Nov. 27, 2013, entitled "Ad Management Using Ads Cached on a Mobile Electronic Device, by Jason R. Delker, et al., both of which are incorporated herein by reference in their entireties for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Advertisements are a beneficial way to promote companies and provide corporations that display advertisements financing that was not available before they displayed the advertisements. An ad presented on a mobile device can be displayed while the mobile device is browsing web sites or interacting with other applications. The ads are relatively limited due to the limited space available for presentation such as a banner across a web page or a side bar on the screen, which is already somewhat limited due to the reduced display area generally available on a mobile device. When an advertisement is displayed on the mobile device, the display can be referred to as an ad experience. Presenting ads on a mobile phone is an opportunity for wireless service providers to capture revenue from advertisers who will pay for ad experiences. Thus, ad experiences may be counted and reported by the mobile device to the wireless service provider in order for the provider to draw revenue from advertisers.

SUMMARY

In an embodiment, a method of measuring ad performance on a mobile device comprises presenting a swipe screen on a mobile device, displaying an ad on the swipe screen on the mobile device, receiving, by one or more input devices on the mobile device, one or more inputs, tracking the one or more inputs as interactions with the ad on the swipe screen, generating an interaction report based on the one or more inputs, and sending the interaction report to a server. The ad is configured to accept a range of inputs corresponding to interactions with the ad when displayed on the swipe screen, and the one or more inputs correspond to an interaction with the ad.

In an embodiment, a method of identifying and retrieving prior displayed content that is not available based on a static location identifier comprises receiving an input on the mobile device when the mobile device is in a sleep mode to transition the mobile device to an awake mode, presenting a swipe screen on the mobile device based on transitioning to the awake mode, receiving a selection of an ad from a list, wherein the ad is not available based on a static location identifier, retrieving the ad based on the selection of the ad, and displaying the ad on the swipe screen on the mobile device.

In an embodiment, a method of interacting with an ad on a swipe screen of a mobile device comprises receiving an input on the mobile device when the mobile device is in a sleep mode, presenting a swipe screen on the mobile device based on providing the input, receiving a selection of an ad, receiving an input to share the ad with a second mobile device, sending a message comprising an identifier for the ad to the second mobile device, generating an interaction report based on sending the message, and sending the interaction report to a server.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 2A, FIG. 2B, FIG. 2C, FIG. 2D, and FIG. 2E illustrate a mobile device and exemplary display screens according to an embodiment of the disclosure.

DETAILED DESCRIPTION

Figure 1:
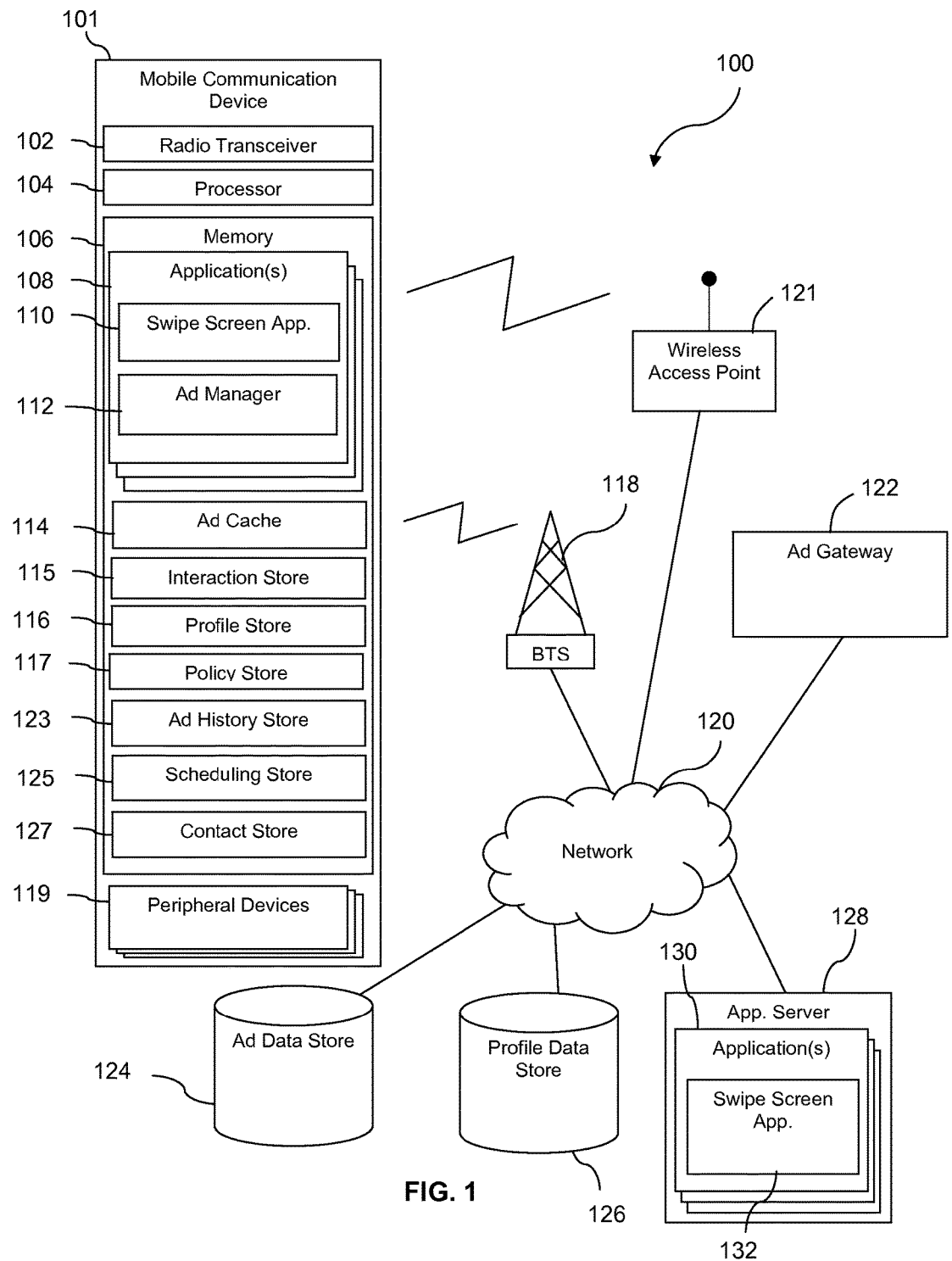
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Disclosed herein are systems and methods for providing advertisements (i.e., ads) having increased display areas and display frequencies by virtue of being displayed on a swipe screen of a mobile device. A swipe screen generally refers to a screen presented in a time sequence after the display of a dark screen, which may also be referred to as a sleep screen display in some contexts, and before the display of a home or desktop display. By responding to a specific gesture to initiate the transition to a lock screen and/or home screen, the swipe screen can be used to prevent inadvertent access or inputs on the mobile device. The swipe screen generally relies on a user providing an input or gesture such as a swipe in a predetermined direction to open the device to the home display. For example, a home button or other input can be depressed or activated to bring up a screen that can receive a gesture such as a swiping motion from one side of the screen to the other in order to reach a lock screen and/or a desktop of home screen of the mobile device. The lock screen, as distinct from the swipe screen, generally responds to a passcode, pattern, or other type of code provided by a user in order to proceed to access the functions of the mobile device.

The swipe screen on most devices covers most of the display area or all of the display area of the mobile device. The swipe screen may be accessed when the phone is transitioned from the sleep mode in which the dark screen is provided to an active mode that allows the user to access the functions of the mobile device. Since a typical user may access their mobile device 50 to 150 times per day, or more in some instances, the opportunity to present an ad on the swipe screen display represents a valuable opportunity for advertisers. Additionally, the large area of the swipe screen display may improve the appeal and/or power of an ad experience. An ad that is presented in or on the swipe screen may be referred to in some contexts as a swipe screen ad.

The swipe screen ads may not follow a traditional advertisement interaction model. For example, advertisements forming a portion of a web page display may track and/or count user interactions by recording the number of selections of the ad by the user. Further, the selection of and/or clicking on the ad may link a user to the advertiser's website or fetch a second, perhaps larger and more detailed advertisement from the advertiser's server, where the advertiser's website can count those user actions. In general, the function of the swipe screen to prevent inadvertent inputs on the mobile device is at odds with a click-through measurement in typical advertisement models. While a swipe screen advertisement may provide the customary experience count feedback to an advertiser in some cases, the feedback may generally comprise other metrics such as an interaction with the swipe screen other than the interaction needed to reach the desktop, lock screen, or an external website or server. The various input devices associated with the mobile device can be used to record the interaction with the swipe screen ads such as the accelerometer, microphone, input keys, camera, and the like. These interactions may be reported to the communication service provider for feedback to the advertisers. Thus, the swipe screen application may facilitate near real time tracking and feedback on the use of the swipe screen ads.

Additional feedback on the ads displayed on the swipe screen may be provided by users. Various additional interactions can include adding the ad to a list such as a history list or bookmarked list, sharing the ad (e.g., through one or more social networking applications), adding the ad to an address book, or the like. The swipe screen application may provide an option for bookmarking or adding an ad to an ad history store. The addition of the ad to the history may indicate that the user has viewed the ad and desires to view or share the ad in the future. Successive views, which may be accessed from a history list, may indicate that the user is continuing to view or interact with the ad and/or sharing the ad with additional users.

The ad may also be shared over a social networking application. The sharing of the ad may be considered an interaction with the ad, and any subsequent views by additional users on their own devices may also be considered interactions with the ads. The sharing may be tracked in a number of ways. For example, a user may send a message allowing the ad to be downloaded by another user. The message can include an identifier of the ad and the originating mobile device. When the ad is obtained by another user, the originating mobile device can be identified and tracked as an interaction with the ad.

In some embodiments, the ad, information within the ad, and/or a subject of the ad may be added to an address book, contact list, calendar application, or other scheduling or contact application of the mobile device. Similar to bookmarking, the addition to the scheduling or contact application may be tracked as an interaction with the ad. For example, an advertisement for a food vendor may be selected and a phone number, address, or other contact information may be added to a contact list on the mobile device. The addition to the contact list may be tracked as an interaction that can be reported back to the mobile device service provider and/or an advertisement provider. Similar interactions with any of the scheduling or contact applications on the mobile device may be tracked.

The feedback associated with advertisements described herein, for example feedback associated with swipe screen ads, may be used for a variety of purposes. For example, the advertiser and/or marketing organization may use the feedback to adapt future advertisements and/or future ad campaigns. In some cases, the advertiser and/or marketing organization may use the feedback to adapt an ongoing and/or in-progress ad campaign. The feedback may be used to promote an ad presentation compensation system that pays higher compensation for higher levels of user interaction with ads.

Turning now to FIG. 1, a communication system 100 is described. In an embodiment, the system 100 comprises a mobile device 101. The mobile device 101 may comprise a radio transceiver 102, a processor 104, and a memory 106. The memory 106 of the mobile device 101 may further comprise a plurality of applications 108 including a swipe-screen application 110 and an ad manager 112. In some embodiments, the ad manager 112 may be a portion of the swipe screen application 110. The memory of the mobile device 101 may further comprise an ad cache 114, an interaction store 115, a profile store 116, a policy store 117, an ad history store 123, a scheduling store 125, and/or a contact store 127. The swipe screen application 110 provides a display of an advertisement from the ad cache 114 on a swipe screen display of the mobile device 101. While illustrated as comprising a plurality of applications and stores, a mobile device 101 may, in some embodiments, comprise less than all of the applications and/or stores illustrated in FIG. 1. In some embodiments, the mobile device 101 may comprise applications and/or stores in addition to the applications and/or stores illustrated in FIG. 1.

An advertisement may be presented on a swipe screen of the mobile device 101. Various exemplary screens that may be presented by a mobile device 201 are illustrated in FIG. 2A through FIG. 2E. FIG. 2A illustrates the mobile device 201 presenting a dark screen 202. As illustrated, the dark screen 202 generally does not display any image and may be used to save on the battery life of the mobile device 201 when the mobile device 201 is not in use (e.g., in a sleep state). Upon receiving an input, a swipe screen 203 may be presented on the mobile device 201 as shown in FIG. 2B.

As shown in FIG. 2B, the swipe screen 203 may generally comprise one or more input points 206, 208 that can accept an input such as a gesture 210 of moving a touch input from a first touch point 206 to a second touch point 208 to move to the lock screen 211 and/or a home or desktop screen 213. By responding to a specific gesture 210 to initiate the transition to a lock screen 211 and/or home screen 213, the swipe screen 203 can be used to prevent inadvertent access or inputs on the mobile device 201.

The swipe screen 203 may be followed by an optional lock screen 211 as shown in FIG. 2C. The lock screen 211 generally responds to a passcode, touch pattern, or other type of code input by a user in order to proceed to access the functions of the mobile device 201. For example, the lock screen 211 may receive an input of a multi-digit passcode into a keypad, a touch input that makes a pattern or connection between points, or an input of a word as a key to allow for further interactions with the mobile device 201. When a lock screen 211 is not present, the swipe screen 203 may proceed directly to a home screen 213. When a lock screen 211 is present, the mobile device 201 may proceed to the home screen 213 when the pass code or input is provided.

As shown in FIG. 2D, the home screen 213 may generally comprise one or more application shortcuts 212, and optionally a home bar 214 comprising common applications or functions or selection buttons or icons for activating common applications or functions. The home screen 213 may generally be used to provide the user with an opportunity to interact with the functions of the mobile device 201. As shown by the sequence of screen presentations in FIG. 2A through FIG. 2D, the swipe screen 203 generally refers to a screen presented at a point in a time sequence between the presentation of the dark screen 202 and the presentation of the lock screen 211 and/or the home or desktop screen 213. Said in other words, when transitioning from the presentation of the dark screen 202 to the presentation of the home or desktop screen 213, the swipe screen 203 may be presented after presentation of the dark screen 202 ends and before presentation of the home or desktop screen 213 begins.

In addition to the gesture input, the swipe screen 203 can display the ad in an ad display area 204. As shown in FIG. 2B, the ad display area 204 may cover a majority of the display area, and in some embodiments, the ad display area 204 may cover substantially all of the display area. The amount of area available for displaying the swipe screen ads can be compared to an ad location 223 on the home screen display of a mobile device 221 shown in FIG. 2E. In contrast to the ad display area 204 in the swipe screen 203, the ad location 223 may be provided in a margin to allow for the shortcut buttons 224 to remain visible. The ad display area 204 available for ad display on the swipe screen 203 may be larger than the area available for ad display in any other screen presented on the device 201. This larger area may promote a more compelling and/or striking ad experience for users of the device 201, and a more compelling user ad experience may generate more user interactions desired by advertisers.

Returning to FIG. 1, the swipe screen application 110 may also monitor the user's interactions with the ad, store the interactions in an interaction store 115, and/or report the interactions to a communication service provider and/or to the advertiser. The ad manager 112 facilitates the loading of the ads into the ad cache 114 and the selection of an ad from the ad cache 114 to display on the mobile device 101. The ad manager 112 can base the ad selection on a number of variables including information in a user profile stored in the profile store 116, rules or policies for displaying ads stored in the policy store 117, contextual information, a priority associated with the ad in the ad cache 114, or any combination thereof, as described in more detail herein. The ad cache 114 contains a plurality of ads that are available on the mobile device 101 for the swipe screen application 110 to display. In an embodiment, the mobile device 101 is one of a mobile phone, a laptop computer, a notebook computer, a tablet computer, a personal digital assistant, or a media player. In an embodiment, the mobile device 101 may be implemented as a handset. Details of handsets are discussed further hereinafter.

The system 100 may further comprise a base transceiver station (BTS) 118, a wireless access point 121, and a network 120. The network 120 may be communicatively coupled to an ad gateway 122, an ad data store 124, a profile data store 126, and an application server 128. The application server 128 may store applications 130 for use with the mobile device 101 such as the swipe screen application 132. In an embodiment, the base transceiver station 118 may provide a wireless communication link to the mobile device 101 and communicatively couple it to the network 120. In an embodiment, the base transceiver station 118 may provide a wireless communication link to the mobile device 101 according to one of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another wireless communication protocol. The wireless access point 121 may communicatively couple the mobile device 101 to the network 120. The wireless access point 121 or other wireless local area network (WLAN) access point may provide a wireless link to the device 101 and/or the network 120. A number of wireless communication protocols may be used including, but not limited to, WiFi, Bluetooth®, and the like.

While one mobile device 101 and one base transceiver station 118 are illustrated in FIG. 1, it is understood that the system 100 may comprise any number of mobile devices 101 and any number of base transceiver stations 118. The network 120 may be a public communication network, a private communication network, or a combination thereof. In an embodiment, the ad gateway 122 may receive a request from the ad manger 112 to retrieve a plurality of ads. The ad gateway 122 may pull a plurality of ads from the ad data store 124, and sends the plurality of ads back to the ad manger 112. In an embodiment, the ad gateway 122 may pull information related to a particular subscriber from the profile data store 126 so it can select ads from the ad data store 124 that are relevant to the subject subscriber's interests. In some embodiments, the ad gateway 122 may push the profile information from the profile data store 126 to the profile store 116 in the mobile device 101 for use selecting ads for display with the swipe screen application 110.

Initially, the swipe screen application 110 can be loaded on the mobile device 101 in a number of ways. For new mobile devices, the swipe screen application 110 can be pre-loaded at the time of manufacturing, deployment, or branding, each of which can occur prior to the user receiving the mobile device 101. For existing devices, the swipe screen application 110 can be obtained from the application server 128, downloaded, and installed on the mobile device 101. The swipe screen application 110 can be obtained as a standalone application, as a package of applications, or the swipe screen application 110 can form a portion of a larger operating system or application operating on the mobile device 101. In some embodiments, the swipe screen application 110 may be downloaded to the mobile device 101 as part of an update to an existing application or operating system. When installed on the mobile device 101, the swipe screen application 110 can operate independently and/or as part of an operating system or application on the mobile device 101.

The swipe screen application 110 can be activated on the mobile device 101 as a result of being downloaded to the mobile device 101 and/or as a result of a user input (e.g., an opt-in input) on the mobile device 101 activating the swipe screen application 110. When activated, the swipe screen application 110 may override or replace an existing swipe screen application 110 on the mobile device 101, if one is present. Alternatively, the swipe screen application 110 may insert a swipe screen display on the mobile device 101 upon receiving an activation input.

When activated, the swipe screen application 110 can be executed by the processor 104 and operate to perform several functions. When the display of the mobile device 101 is at a dark screen (e.g., in a sleep mode), an initial input may cause the swipe screen application 110 to display the swipe screen on the mobile device 101. Various initial inputs can be used to awaken or initiate the swipe screen display such as a button being depressed, a touch screen input, a specific action on the device, the formation of a connection (e.g., a connection to a power source, a computer, etc.), an incoming call or message, and/or an input generated by an application on the mobile device 101 (e.g., an alert, alarm, a message, etc.).

When the initial input is received, the swipe screen application 110 may generate a display comprising an ad selected from the ad cache 114 and present the ad on the mobile device 101. The selection of the ad may be performed by the swipe screen application 110 and/or the ad manager 112. The display may allow for a gesture input from the user to proceed from the swipe screen display to a lock screen and/or the home screen or desktop of the mobile device 101. The swipe screen application 110 may also be configured to accept additional inputs related to interactions with the ad, as described in more detail herein. By displaying ads in or on the swipe screen display, the swipe screen application 110 may present one or more of the plurality of ads available each time the mobile device 101 is accessed by the user as well as presenting the first information seen by the user upon accessing the mobile device 101.

In an embodiment, the interactions with the swipe screen display may not provide for a functional connection to a website or external application, which may allow the swipe screen display to retain its ability to prevent inadvertent interactions with the mobile device 101. As a result, even the intended interactions with the ad on the swipe screen display may not generate a request to an external server or source. In this event, a traditional click-through measurement where the user interactions are measured by the vendor may not be applicable to the swipe screen ads. As a result, the swipe screen application 110 may record and store the various types of input and interactions in the interaction store 115. Various other information associated with any inputs and interactions such as the name of the ad, identity of the ad, an interaction timestamp, type of interaction, subscriber or user ID, mobile device ID, or the like may be recorded and/or transmitted by the swipe screen application 110.

In an embodiment, the ad presented on the swipe screen display may be displayed across all or a substantial portion of the display on the mobile device 101, which can be referred to as a full screen ad in some contexts (e.g., the ad display area 204 as shown in FIG. 2B). The ads may comprise relatively static ads consisting of a display of advertising information, and/or the ads may comprise interactive displays, applications, and/or content. When an ad is relatively static, a user may interact with the ad by providing inputs such as touching, selecting a link, sharing the ad, storing information associated with the ad, or a variety of other actions.

The use of interactive ads may allow the user to interact with the ads on the swipe screen display. Rather than link to another source of content, some ads may allow for interactions within the swipe screen display itself. In an embodiment, an ad may comprise a game or simulation that can respond to an input on a touch screen, keys, an accelerometer, a microphone, a camera, or some other input or peripheral device(s) 119 of the mobile device 101. For example, an advertisement for a new vehicle may allow a user to simulate driving the vehicle by touching a touch screen interface of the mobile device 101 or tilting or rotating the mobile device 101 to interact with an accelerometer of the mobile device 101 and thereby drive the simulated vehicle. In this case, the advertisement and/or advertisement application may present images on the display consistent with the steering inputs. Similarly, an ad for a beverage may present an image of a glass containing a beverage. A user may then tilt or otherwise rotate the mobile device 101 to simulate pouring the beverage, thereby providing an input to the accelerometer. In this case, the ad and/or advertisement application may present images on the display consistent with pouring the beverage.

The swipe screen application 110 may also allow for other inputs or combinations of inputs for an ad. In an embodiment, a microphone may be used to accept a voice input, a sound, or the like to interact with the ad. For example, an ad for a lighter may accept an input on the microphone to simulate blowing an illustrated flame. When a user blows on the microphone, the illustrated flame may flicker or blow out. Similarly, a voice input may be accepted as a response to a question. In some embodiments, an ad may accept a camera or video input. For example, a picture may be provided by a user of an advertised item and incorporated into the ad. The resulting ad can then be viewed or shared based on the camera input.

In some embodiments, the gesture needed to proceed past the swipe screen may comprise an interaction with the ad. For example, the ad may require a user to drag an object associated with the ad to a certain location in order to provide the gesture. As an example, the ad may be for a dessert item, and the gesture needed to proceed past the swipe screen display may comprise dragging an image of the dessert item into a mouth. This type of association may prompt the user to interact with the ad to some degree in order to proceed past the swipe screen display. In some embodiments, the user may be able to provide a gesture such as a swipe or tap that can bypass the ad on the swipe screen and proceed to a lock screen and/or desktop or home screen of the mobile device 101.

The various types of inputs resulting from the user interactions with the ads can be recorded by the swipe screen application 110. In an embodiment, recording the interactions may optionally be based on receiving an input in a manner that reflects that it is associated with the ad. An ad may accept one or more inputs from the input and/or peripheral devices associated with the mobile device 101. The swipe screen application 110 may be limited to recording or storing those inputs associated with the particular ad. For example, an ad allowing for inputs in the form of a touch or movement on a touch screen may not record inputs from a microphone or camera associated with the mobile device 101.

Further, the inputs may optionally be analyzed to determine if they correspond to interactions with the ad. Within the expected range of inputs, the swipe screen application 110 may detect various inputs during the display of the ad. However, not all of the inputs may correspond to inputs associated with the ad. The swipe screen application 110 may be configured to only accept inputs from certain input devices that fall within a threshold of an expected input. The thresholds may be based on the time of the input, the direction or magnitude of the input, and/or the type of input. For example, an ad providing a simulated driving experience may be associated with a touch input on a touch screen and/or an input associated with an accelerometer. When a touch screen input is received, it may be analyzed to determine if the touch screen input corresponds to an expected range of touch screen inputs associated with the driving simulation. Touch screen inputs that would not fall within an expected range of inputs, such as those randomly crossing the screen, periodic point touching, etc., may indicate that the user is not interacting with the ad, but may be inadvertently touching the touch screen or attempting to provide a gesture to bypass the swipe screen ad. When the analyzing indicates that the inputs are not associated with an interaction with the ad, the swipe screen application 110 may not record inputs as interactions with the ad. The correspondence of the inputs with the expected range of inputs may be considered when calculating an interaction score as described in more detail herein.

In an embodiment, interactions with the ad that occur prior to receiving an input intended to proceed past the swipe screen display may be recorded. For example, the swipe screen application 110 can record the interactions with the ad until the gesture is provided that performs the swipe function or otherwise proceeds past the swipe screen display. When the gesture used to proceed past the swipe screen display is part of the interaction with the ad, the swipe screen application 110 may record the input or gesture in addition to any other interactions with the ad.

The swipe screen application 110 may also record interactions with the ads based on a number of other inputs. In an embodiment, the swipe screen application 110 may record an ad being bookmarked or added to a history of ads, a request to replay an ad from the history or bookmarked list, social sharing of the ad, and/or adding the ad, information associated with the ad, or information associated with the subject of the ad to a scheduling or contact application on the mobile device 101.

In an embodiment, the swipe screen application 110 may create a history of the ads that are displayed on the swipe screen display. As the ads are displayed on the swipe screen display, the swipe screen application 110 may create a record of the ad display that may include an identifier for the ad, a display time, display length, an indication of whether or not the user interacted with the ad, and the like. The history record may be stored in the ad history store 123. The history record may be appended to a list of additional ad display history records, or each history record may be maintained separately. In some embodiments, the history record may comprise a text list of the information identifying the ads in the order in which they are displayed. In some embodiments, the ads may be presented in a reverse order from which they have been displayed (e.g., the most recent ad is presented first followed by the next most recent ad, etc.). The ad history record may not contain a copy of the ad itself, which may allow the history list to be limited in file size. The ad history store 123 may retain the ad records for a certain period of time (e.g., for the last 12 hours, for the last day, the last week, the last month, etc.), for a certain number of ads (e.g., the last 10 ads, the last 20 ads, the last 50 ads, the last 100 ads, etc.), for the ads available on the mobile device 101 (e.g., a history of display for all ads in the ad cache 114), or the like.

The swipe screen application 110 may be configured to allow a user to access the ad history list and select an ad for display or sharing. This feature may be useful to allow a user who would like to view the ad at a later time to access the ad, to allow a user to access a past ad for sharing, and the like. Since the ads may comprise interactive applications, a user may want to interact with an ad multiple times and/or share the ad with others. For example, a vehicle ad that allows users to simulate driving the vehicle may be perceived as a race game on the swipe screen. A user may then want to re-access the ad multiple times to play the game featuring the vehicle being advertised. In order to access the ad, the user may select a history list, and the swipe screen application 110 may retrieve the list of ads displayed on the swipe screen display in the past. A selection may then be received from a user for an ad in the history list.

The user may be able to select an ad from the list, and the swipe screen application 110 may generate a swipe screen display of the ad in response to the selection. In order to access the selected ad, the swipe screen application 110 may obtain the identifier for the ad from the ad history list and attempt to locate the ad in the ad cache 114. When the ad is in the ad cache 114, the ad may be initiated and displayed on the swipe screen display from the ad cache 114. In some embodiments, the ad may have been removed from the ad cache 114. In this event, the swipe screen application 110 may notify the ad manager 112 that the ad is being requested and pass the identifier for the ad to the ad manager 112. The ad manager 112 may then obtain the ad from the ad data store 124 over the network 120. Once the ad has been retrieved and/or saved in the ad cache 114, the ad may be initiated and displayed on the swipe screen display. If the ad is no longer available, a message may be displayed indicating that the ad is not available for display.

The selection of the ad from the ad history list may be recorded by the swipe screen application 110 as an interaction with the ad. The selection of an ad for viewing may be considered an interaction even if no user inputs are received during the display of the ad. Other interactions such as repeated viewings of the ad (e.g., repeated within a certain time period, successive views, etc.) may be recorded as interactions with the ad.

In some embodiments, an ad displayed by the swipe screen application 110 may be bookmarked or otherwise added to a favorites list. The concept of bookmarking the ad may not follow the traditional bookmarking techniques. In general, information such as a web page may be bookmarked by adding the fixed address or location information to a list. Since the ads are transitory in nature and not maintained at a fixed web address, or in some embodiments, even at a fixed server location, the ads cannot simply be marked based on a fixed location address. Rather, the information for the ad can be maintained in a bookmarked list to allow the ad to be located and displayed on the swipe screen display.

As an ad is displayed by the swipe screen application 110, the swipe screen application 110 may be configured to receive an input indicating that the ad should be included in a favorites list. The input may be similar to bookmarking the ad in a list. In response to the input, the swipe screen application 110 may create a bookmark record of the ad that may include an identifier for the ad, a display time, display length, and/or an indication of whether or not the user interacted with the ad. The bookmark record may be stored in the interaction store 115 and/or the ad history store 123 as a bookmarked record.

The bookmark record may be appended to a list of additional bookmarked ad records, or each bookmark record may be maintained separately. The appended records and/or the group of bookmarked records may be referred to as the bookmarked list. In some embodiments, the bookmark record may comprise a text list of the information identifying the ads that have been selected for adding to the bookmarked list. The bookmark record may not contain a copy of the ad itself. The bookmarked records may be maintained for a certain period of time, for a time set by the user, for a period of time from the last interaction with one or more of the bookmarked records, or any other interval. When an ad is selected and added to the bookmarked records, the ad may be maintained in the ad cache 114 by the ad manager 112. For example, when the ad would otherwise be deleted or de-indexed, the ad manager 112 may retain the ad in the ad cache 114 to allow the ad to be accessed through the bookmarked list.

The swipe screen application 110 may be configured to allow a user to access the bookmark list and select an ad for display or sharing. This feature may be useful to allow a user who would like to view the ad at a later time to access the ad, to allow a user to access a past ad for sharing, and/or to view the ad again. Since the ads may comprise interactive applications, a user may want to interact with an ad multiple times and/or share the ad with others. In order to access the ad, the user may select a bookmarked list, and the swipe screen application 110 may retrieve the list of ads in the bookmarked ad records. A selection may then be received from a user for an ad in the bookmarked list.

The user may be able to select an ad from the bookmarked list, and the swipe screen application 110 may generate a swipe screen display of the ad in response to the selection. The swipe screen application 110 may obtain the identifier for the ad and attempt to locate the ad in the ad cache 114. When the ad is in the ad cache 114, the ad may be initiated and displayed on the swipe screen display from the ad cache 114. In some embodiments, the ad may have been removed from the ad cache 114. In this event, the swipe screen application 110 may notify the ad manager 112 that the ad is being requested and pass the identifier for the ad to the ad manager 112. The ad manager 112 may then obtain the ad from the ad data store 124 over the network 120. Once the ad has been retrieved and saved in the ad cache 114, the ad may be initiated and displayed on the swipe screen display. If the ad is no longer available, a message may be displayed indicating that the ad is not available for display.

The input requesting the bookmarking of the ad may be considered an interaction with the ad. Further selection of the ad from the bookmarked record(s) may also be recorded by the swipe screen application 110 as an interaction with the ad. The selection of an ad for viewing may be considered an interaction even if no user inputs are received during the display of the ad. Other interactions such as repeated viewings (e.g., repeated within a certain time period, successive views, etc.) of the ad may be recorded as interactions with the ad.

In an embodiment, the swipe screen application 110 may be configured to enable a user to share the ad with another mobile device or user, which may be recorded as an interaction with the ad. When the ad is displayed, selected from a history list, or from a bookmarked list, the swipe screen application 110 may provide an option to share the ad with another mobile device. When the ad is selected from the history list or the bookmarked list, the ad may not need to be displayed prior to providing the ability to share the ad. In response to an input from a user to share the ad, the swipe screen application 110 may generate a message that allows one or more additional mobile devices to obtain and view the ad. For example, the ad may be shared with a second mobile device. When the second mobile device does not have the swipe screen application 110, the second mobile device may obtain, install, and activate the swipe screen application 110 in order to view the ad. In this embodiment, the sharing of the ad with a second mobile device may advantageously result in another activation of the swipe screen application 110 that can display more than just the ad shared with the second mobile device.

The sharing of the ad with the second mobile device may proceed by various routes. In an embodiment, a message comprising an identifier for the ad, an identifier for the mobile device, and/or additional data associated with the ad, the swipe screen application, and/or the mobile device may be generated in response to receiving the input indicating that the ad should be shared. The identifying information may be hashed in a header of a message comprising the address of the second mobile device. The message may also comprise the address of the ad gateway 122 from which the ad can be obtained. The address of the second mobile device may comprise an identifier for the second communication device such as a phone number, mobile ID, or the like. The message may be sent to the second mobile device directly, by providing the message through one or more social sharing websites or applications (e.g., Facebook, Twitter, etc.), by providing the message as an email, by providing the message through a messaging service (e.g., SMS, RSS feed, etc.), or the like. The message may comprise a link or instructions to allow the second mobile device to obtain the ad.

Upon selection of the message (e.g., a link within a message) by the second mobile device, a communication may be generated based on the information within the message. For example, the communication may be sent to the ad gateway 122 based on the ad gateway address within the message. The communication may identify the ad to be obtained as well as the identifier for the mobile device that originated the sharing request. The communication may allow the ad to be downloaded for viewing on the second mobile device.

In some embodiments, the ad gateway 122 may send a response to the second mobile device to verify that the swipe screen application 110 is installed on the second mobile device. When the swipe screen application 110 is not installed on the second mobile device, the ad gateway 122 may attempt to load the swipe screen application 110 on the second mobile device. For example, the ad gateway 122 may automatically load the swipe screen application 110 and ad manager 112 on the second mobile device. In some embodiments, a notification may be displayed on the second mobile device asking the user to opt-in to the swipe screen application 110 in order to view the ad. When the user provides an opt-in input, the swipe screen application 110 can be downloaded and activated on the second mobile device. When the swipe screen application 110 is installed on the second mobile device, the ad may be sent to the second mobile device from the ad gateway 122 and/or the ad data store 124 along with a prioritization message configured to prioritize the ad to be displayed first when the swipe screen application 110 displays an ad. The ad may then be displayed when the swipe screen display is presented on the second mobile device. In some embodiments, the prioritization message may direct the second mobile device to display the ad in response to downloading the ad to the ad cache 114.

The sharing of the ad may be initiated by an input from a user of the mobile device 101 and/or automatically. In an embodiment, the sharing may occur automatically for one or more ads that receive interactions, are re-accessed from the history list, and/or are bookmarked. The automatic sharing of the ads may result in the ads being sent to one or more mobile devices that may be defined by the user of the mobile device 101 (e.g., selected by the user, on the same user account, etc.). For ads that are re-accessed from a history list and ads that are bookmarked, the history list itself and/or the bookmarked list may also be shared with one or more mobile devices.

The input requesting that the ad be shared with a second mobile device may be considered an interaction with the ad. This interaction may be recorded by the swipe screen application 110 on the mobile device 101. The interaction may also be recorded by the ad gateway 122 when the request for the ad is received from the second mobile device. For example, the communication from the second mobile device to the ad gateway 122 may comprise an identifier for the mobile device 101, thereby identifying the originating mobile device 101 to the ad gateway 122. The connections between devices and sharing can then be recorded by the ad gateway 122 as the ad continues to be shared. The resulting connections and related sharing may be recorded as related interactions with the ad. Further, the downloading and viewing of the ad by the second mobile device may also be recorded as an interaction with the ad.

In an embodiment, the ad, information within the ad, and/or a subject of the ad may be added to an address book, contact list, calendar application, or other scheduling or contact application of the mobile device 101. Similarly to bookmarking, the addition to the scheduling or contact application, which may comprise a corresponding scheduling store 125 and/or contact store 127, on the mobile device 101 may be tracked as an interaction with the ad. For example, an advertisement for a food vendor may be selected and a phone number, address, or other contact information may be added to a contact list on the mobile device 101. The addition to the contact list may be tracked as an interaction that can be reported back to the mobile device service provider and/or an advertisement provider. Similar interactions with any of the resulting scheduling or contact information on the mobile device 101 may be tracked.

In an embodiment, the swipe screen application 110 may add information to the scheduling store 125 and/or the contact store 127 in response to an input from a user. For example, when the ad is displayed on the swipe screen display of the mobile device 101, the user may select an option to add information related to the ad to the scheduling store 125 and/or the contact store 127. The information related to the ad may not be directly presented within the ad itself. For example, an option to add contact information for a restaurant being presented in an ad may result in a phone number and address of the restaurant being added to the contact store 127 even if the contact information is not illustrated in the ad. As another example, an option to add scheduling information for an upcoming concert may be selected by a user even if the concert date of a particular concert is not included in the ad.

The information added to the scheduling store 125 and/or the contact store 127 may be provided in several ways. In an embodiment, the information may be contained within the ad displayed on the swipe screen display (e.g., a phone number displayed within the ad). In some embodiments, the information may be included as metadata within the ad, the information may be stored in the ad cache 114, and/or the information may be obtained from the ad gateway 122. For example, contact information associated with an ad may be obtained from the ad gateway 122 in response to receiving a request to add the contact information to the contact store 127.

Additional information from the mobile device 101 may be utilized in selecting the information to be stored in the scheduling store 125 and/or the contact store 127. For example, location information associated with the mobile device 101 may be used to determine the contact information and/or scheduling information to store in the scheduling store 125 and/or the contact store 127. The location information can be based on a location determination based on a global positioning system (GPS) sensor and/or receiver within the mobile device 101. In another embodiment, the location of the mobile device 101 may be determined based on an available Worldwide Interoperability for Microwave Access (WiMAX) access point, an available WiFi access point, an available femtocell access point; or other available wireless access points regardless of whether the mobile device 101 is actually connected to the available wireless access point. For example, the mobile device 101 may receive a broadcast signal from a wireless access point that contains an identifier for the subject access point. In this case, the indication of current location may comprise an identity of one access point, identities of a plurality of access points, or other information about what wireless access points are in range of the mobile device 101.

In the examples provided above, the contact information for the restaurant may be determined by obtaining the location of the mobile device 101 and selecting the contact information for the closest restaurant location based on the current location of the mobile device 101. Similarly, the scheduling information for a concert may be selected based on the concert date for the closest concert venue to the current location of the mobile device 101. In some embodiments, additional information contained in the profile store 116 may be used to determine the information added to the scheduling store 125 and/or the contact store 127. For example, a home address, area code, or other location information may be obtained from the profile store 116. In some embodiments, demographic data may be used to select the information stored in the scheduling store 125 and/or the contact store 127. The demographic data may be obtained from the profile store 116 and can include, but not limited to, one or more of gender, ethnicity, age, financial status, educational level, and interests.

The input requesting that the information associated with the ad can be included in the scheduling store 125 and/or the contact store 127 may comprise an interaction with the ad. This interaction may be recorded by the swipe screen application 110 as an interaction with the ad. When the information is stored in the scheduling store 125 and/or the contact store 127, the information may be stored along with an identity of the ad and/or other information indicating that the information was stored as a result of an interaction with the ad. Any subsequent use of the information may be linked to the ad through the information, and the use of the information may be considered an interaction with the ad. For example, storing the contact information for a restaurant and subsequently accessing the information to place a call to the restaurant may be recorded by the swipe screen application 110 as an interaction with the ad. The identifying information for the ad may be used to link the information in the scheduling store 125 and/or the contact store 127 to an ad from which the information was obtained. Further, the information added to the scheduling store 125 and/or the contact store 127 may be shared with other users, and the information may include the identifying information for the ad that originated the information. The sharing and/or any subsequent use of the information may be recorded as an interaction with the ad.

In an embodiment, the swipe screen application 110 may calculate an interaction score based on one or more interactions with the ad as described above. In an embodiment, the interaction score may be based, at least in part, on the inputs received with the appropriate input devices and the correspondence of those inputs with the ad that falls within the threshold of the expected input. The interaction score may also be based, at least in part, on interactions resulting from accessing the ad from a history list, bookmarking the ad, accessing the ad from the bookmarked list, sharing the ad, and/or adding information to the scheduling store 125 and/or the contact store 127. Since more than one input and/or interaction may be received, the interaction score may be used to take into account all of the inputs and/or interactions with the ad.

Various measurements may be used to produce the interaction score. When the interactions are based on inputs on the mobile device 101 that are associated with the ad being displayed, one or more threshold interactions may be set for each input device that can accept inputs for an ad. The advertisement provider may establish the types of inputs that can be accepted as inputs for an ad and/or set the threshold inputs that may constitute an interaction with the ad. When an input is received from an input device, the length of the input or inputs, correspondence with the ad, level of interaction, and the like may be used to calculate a score for the input device. When only one input device or type of input is associated with an ad and no other interactions are recorded, the score may be considered the interaction score. When multiple input device or types of input are associated with an ad, the swipe screen application 110 may combine the individual scores to generate the interaction score. The individual scores can be added together, or the individual scores can be weighted prior to combining the individual scores. In an embodiment, the individual scores may be compared to a threshold prior to determining the interaction score to determine if the score should be included in an overall interaction score. In some embodiments, the interaction score may be determined and then compared to an overall threshold interaction value, where the overall threshold value can be predetermined or determined from a combination of individual threshold values in the same way as the interaction score.

In some embodiments, additional interactions with the ad may also be factored into the interaction score. For example, the interactions resulting from accessing the ad from a history list, bookmarking the ad, accessing the ad from the bookmarked list, sharing the ad, and/or adding information to the scheduling store 125 and/or the contact store 127 may be considered interactions that may affect the interaction score. These interactions may be recorded separately from an interaction score based on inputs received during the display of the ad, or the interactions may be figured into the calculation of an overall interaction score. Various weighting schemes may be used to determine the relative value of the interactions received based on the interactions resulting from accessing the ad from a history list, bookmarking the ad, accessing the ad from the bookmarked list, sharing the ad, and/or adding information to the scheduling store 125 and/or the contact store 127. The interaction score may be used to determine if the interactions with the ad are sufficient to be reported as an interaction. For example, when an interaction score threshold is available, only those interaction scores exceeding the threshold may be reported as interactions.

The one or more interaction scores may be stored in the interaction store 115, and the one or more interaction scores may then be reported for the ad by the ad manager 112. For example, the one or more interaction scores may be sent to the ad gateway 122 in an ad interaction report to provide feedback on the user interactions with the ads. In some embodiments, the value paid for an ad or a plurality of ads by an advertisement provider may be based on the resulting interaction scores. The interaction score may also be used to determine the relative level of interaction between two or more ads displayed on the swipe screen display.

The ad manager 112 may monitor ad interactions, accumulate counts, the interaction score, and/or other data about ad interactions, and/or send the ad interaction report to the interaction store 115 on the mobile device 101, the ad data store 124 over the network 120, an advertiser provider server, and/or to a server computer in the wireless service provider's network. In an embodiment, the ad manager 112 may be a part of the swipe screen application 110 so that the swipe screen application 110 performs the monitoring, counting, and reporting functions. The ad interaction report may comprise counts of ad interactions, types of interactions, ad name or other ad identifier, user name or other user identifier, one or more interaction scores, and/or other data about the ad interactions or inputs from the user. Additional data may comprise, for example, information about accessing the ad from a history list, bookmarking the ad, accessing the ad from the bookmarked list, sharing the ad, and/or adding information to the scheduling store 125 and/or the contact store 127, or the like.

The ad interaction report may be transmitted by the mobile device 101 and/or the ad manager 112 in response to recording an interaction, periodically (e.g., once per day, once every two days, once per week, or at some other periodic interval). Alternatively, the ad interaction report may be transmitted by the mobile device 101 and/or the ad manager 112 on an event, for example, in response to receiving a request to transmit the ad interaction report or in response to the ad interaction report exceeding a threshold size, for example exceeding 100 ad interactions, exceeding a predefined file size, and/or exceeding a predefined interaction score threshold. In an embodiment, the interactions can be sent to the server in near real time. As used herein, near real time refers to an action occurring within about 15 minutes, about 5 minutes, about 1 minute, about 30 seconds, about 20 seconds, or about 10 seconds of the event and may take into account such actions as processing time, system latency, and communication delays. The transmission of the interaction report from the mobile device 101 to a server may provide feedback on the user interactions with the ads to the advertisement providers. The advertisement providers may use the information to provide more targeted advertisements, optimize campaign strategies, generate revenue tracking information, or the like.

The ad manager 112 may also be configured to load one or more ads into the ad cache 114. The ads in the ad cache 114 can be received from the ad gateway 122, which may receive the ads from the ad data store 124. In general, the ads are stored in an ad cache 114 rather than being requested each time an ad is requested by the swipe screen application 110 to avoid overloading the network connections and to account for times when the network connectivity is unavailable. Further, rich, multi-media ads can be displayed by the swipe screen application 110 that may include ads having a relative large file size and may take greater than thirty seconds or a minute to be downloaded from the network, which may be an unacceptable delay in presenting the ad on the swipe screen display. By placing the ads in the ad cache 114 on the mobile device 101, the ads may be presented faster than when they are downloaded at the time they are to be presented from the network 120.

In an embodiment, the ad manager 112 may update the ads in the ad cache 114 by sending a request to the ad gateway 122 for a plurality of ads. The ad gateway 122 may select a plurality of ads from the ad data store 124. The ad selection can be based on a number of factors including a relative importance of the ads, profile data from the profile data store 126 on the user of the mobile device 101, active advertisement campaigns, and the like. The ad gateway 122 may then transmit the plurality of ads to the ad manger 112. Upon receiving one or more of the ads, the ad manager 112 can store the ads into the ad cache 114. The ad cache 114 can store a plurality of ads. In an embodiment, the ad cache 114 can store at least about 20 ads, at least about 30 ads, at least about 40 ads, at least about 50 ads, or at least about 60 ads.

In an embodiment, the ads may be updated in the ad cache 114 by being pushed from one or more sources coupled to the network 120, such as by the ad gateway 122. The service provider may generate an ad payload comprising one or more ads, and the service provider may send a notification to the mobile device 101 that the ad payload is available for updating the ad cache 114. The mobile device 101 may retrieve the ad payload from the ad data store 124, and the ad manager 112 may process the ad payload. The ad manager 112 may retrieve the ad payload based on certain restrains, which are described in more detail herein. In some embodiments, the ad gateway 122 may send the ad payload to the mobile device 101 without first sending a notification. The ability of a network element such as the ad gateway 122 to initiate the transfer of ads into the ad cache 114 may allow for dynamic updating and display of the ads on the swipe screen display. The dynamic updating may allow for new advertising campaigns, targeted ads, and the like to be distributed to a mobile device 101.

The ad manager 112 may also be configured to selectively download ads based on a priority assigned by the ad gateway 122. The ads may be ranked by the communication service provider and/or an advertisement provider, with more important or higher priority ads being given a higher priority value. In some embodiments, the priority of the ads may be determined by a request to share an ad and/or an automatic sharing of the ad. For example, when a second user shares an ad, the ad may be received by the ad manager 112 into the ad cache 114 with a highest level priority so that the ad is the first ad to be displayed when the swipe screen display is activated.

In an embodiment, the ad manager 112 monitors the ads in the ad cache 114 and can selectively replace the ads. The ads in the ad cache 114 may be replaced based on the number of times the ad is displayed on the swipe screen display, a given date or time range, a limited number of interactions with the ad, and the like. When the ad manager 112 determines that an ad should be replaced, it may remove the ad from the ad cache 114 or otherwise remove it from a list of ads being sent to the swipe screen application 110 for display on the swipe screen of the mobile device 101. The ad manager 112 may then selectively reload the ad cache 114 with one or more additional or replacement ads.

In an embodiment, the ad manager 112 can be configured to apply user profiles and/or policies to obtain a subset of the ads in the ad cache 114 for presentation on the swipe screen display. The ad manager 112 may apply one or more policies or rules from the policy store 117 and/or apply one or more rules based on a user profile stored in the profile store 116. The policy store 117 may comprise rules established by the communication service provider and/or an advertisement provider for controlling the display of the ads on the swipe screen display. The rules may be used in determining ads for a demographic group, determining the frequency at which an ad can be displayed, determining the time during which the ad can be displayed, determining a display based on a priority of the ad, determining a context in which the ad is displayed, coordinating an ad with an external marketing campaign, and combinations thereof. In general, the ads can be selected from the ad cache 114 on a round robin type selection scheme. However, the application of the policies and profile information may result in less than all of the ads being displayed from the ad cache 114 and/or the ads appearing in a different order and/or at a different frequency than the manner in which the ads are stored in the ad cache 114. Additional details on the selection of the ads from the ad cache can be found in U.S. application Ser. No. 14/165,571, entitled "Ad Management Using Ads Cached on a Mobile Electronic Device," by Robert H. Burcham, et al., and filed on Jan. 27, 2014, which is incorporated herein by reference in its entirety for all purposes.

The application of the policies from the policy store 117 and/or the user profile information from the profile store 116 may occur at or near the time the ads are received from the network 120 and stored in the ad cache 114. In some embodiments, the ad manager 112 may apply the policies and profiles at the time the ad is selected to be sent to the swipe screen application 110. In still other embodiments, the ad manager 112 may apply the policies and profiles between the time the ads are received and stored in the ad cache 114 and the time the ads are sent to the swipe screen application 110.

Figure 3:
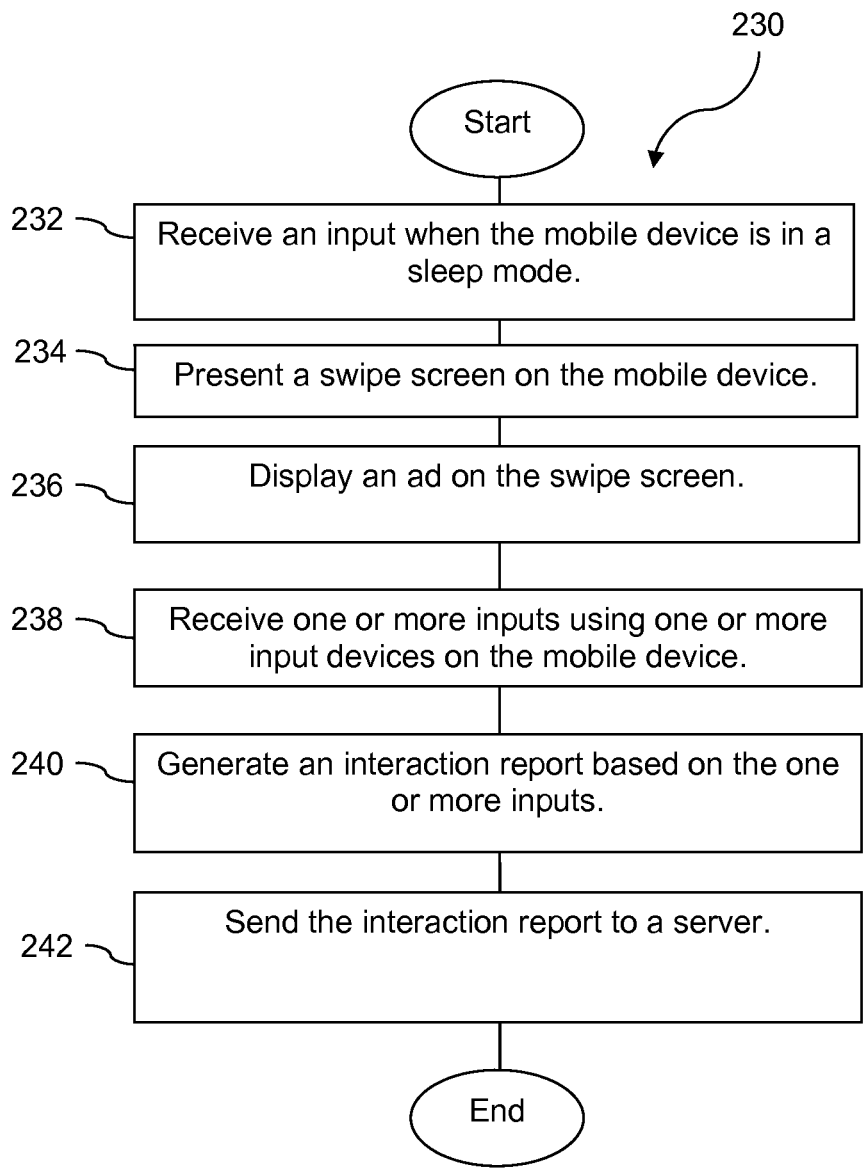
FIG. 3 is a flow chart of a method according to an embodiment of the disclosure.

Turning now to FIG. 3, a method 230 of interacting with an ad on a swipe screen of a mobile device 101 is described. At step 232, an input can be received on the mobile device 101 when the mobile device 101 is in a sleep mode. The swipe screen can be presented on the mobile device 101 based on providing the input in step 234.

An ad can be displayed on the swipe screen of the mobile device 101 in step 236. For example, the swipe screen application 110 can execute on a processor 104 to generate the swipe screen display having the ad. At step 238, one or more inputs can be received by the mobile device 101. The inputs can be received by one or more input devices associated with the mobile device 101. For example, the one or more input devices can include, but are not limited to, a touch input, a keyed input, an accelerometer reading, a microphone input, or a camera input. The inputs can correspond to an interaction with the ad. For example, the interactions may comprise a touch input at a location in the ad, and/or the interactions can comprise a tilting of the mobile device 101 to interact with an accelerometer in the mobile device 101, thereby correctly steering a simulated vehicle along a simulated pathway.

In some embodiments, a gesture input can be received on the mobile device 101. The gesture input may transition the swipe screen display to a lock screen and/or a home screen. In some embodiments, the gesture input that transitions the swipe screen to the lock screen and/or home screen may comprise part of the one or more inputs that interact with the ad. For example, the gesture input may be incorporated into the ad so that a user may trace a portion of an ad or move an object to a specific location. Thus, providing the gesture may comprise an interaction with the ad itself. In other embodiments, the gesture may be unrelated to the ad, and only the inputs occurring between the presentation of the ad and providing the gesture may be considered interactions with the ad.

At step 240, an interaction report can be generated based on the one or more inputs representing the interaction with the ad. At step 242, the interaction report can be sent to a server. The interaction report may comprise the one or more inputs and/or the interaction report may comprise an interaction score based on the one or more inputs. The interaction score may comprise a single metric or a plurality of metrics that measure the level of interaction with the ad based on the one or more inputs, and optionally, additional interactions such as viewing the ad from a history list, bookmarking the ad, viewing the ad from a bookmarked list, sharing the ad, and/or adding information associated with the to a scheduling or contact application on the mobile device 101. When an interaction score is calculated, the interaction report may comprise the interaction score when it is sent to the server.

In some embodiments, the interaction score may be compared to a threshold score. Once the interaction score is calculated, the interaction score can be compared to the threshold score. The generation of the interaction report and/or the sending of the interaction report to a server may then be based on the interaction score exceeding the interaction score threshold. For interaction scores that are less than the interaction score threshold, the interaction report may not be sent or may not indicate an interaction with the ad.

The interaction report may be received by the server and used to determine an amount to charge for the ad. In general, the ad may be created and/or provided by an advertisement provider, which may generally pay more for an ad that has been identified as having a user interaction than an ad that is simply displayed without any interaction. The interaction report may then serve as a basis for the amount charged for the ad. Further, the amount charged may be based on the interaction score, which can be used to determine a level of engagement with the ad. In contrast to a click-through count for an ad, which may simply acknowledge that the ad was clicked on or viewed, the interaction score may provide more in-depth information as to the length of time that a user interacted with an ad, the extent to which the user shared the ad, and/or tracking of use of the information obtained from the ad.

Figure 4:
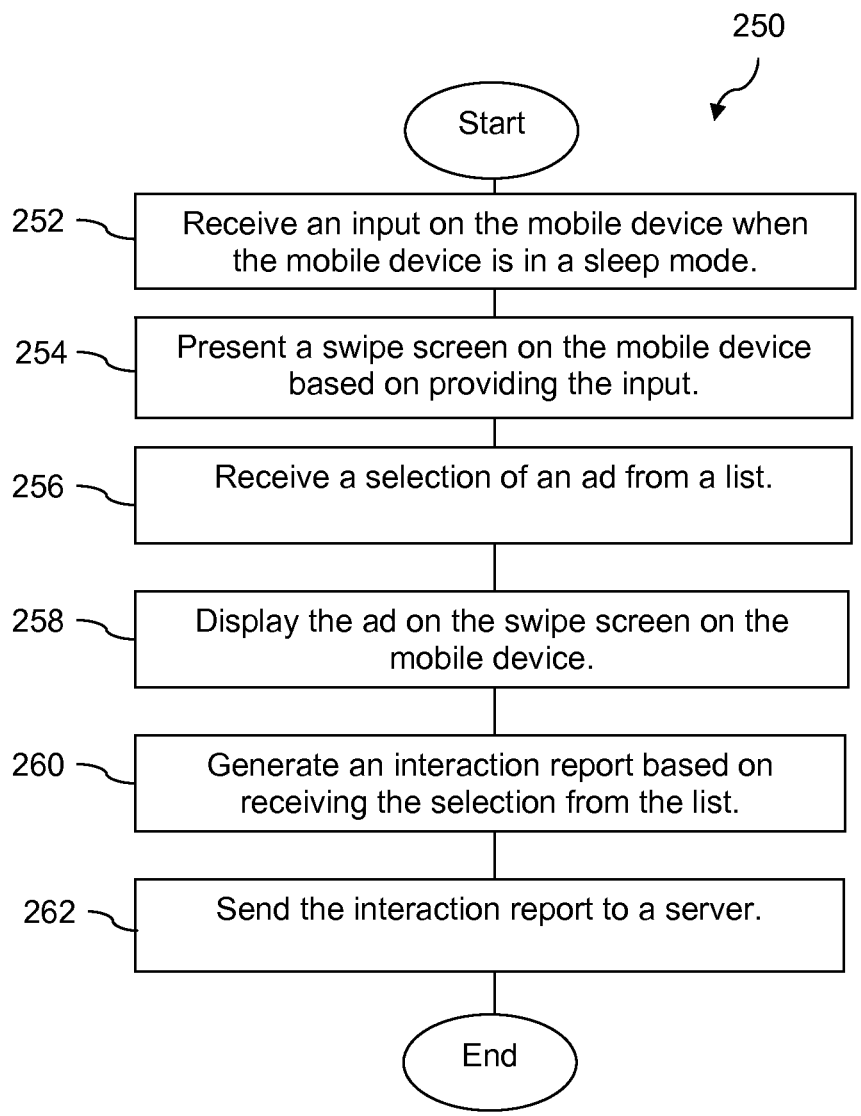
FIG. 4 is a flow chart of another method according to an embodiment of the disclosure.

Turning now to FIG. 4, a method 250 of interacting with an ad on a swipe screen of a mobile device 101 is described. At step 252, an input can be received on the mobile device 101 when the mobile device 101 is in a sleep mode. The swipe screen can be presented on the mobile device 101 based on providing the input in step 254.

An ad can be selected from a list in step 256. Various lists can be used to provide a selection of the ad. In an embodiment, the list may comprise a history list. The history list may comprise a plurality of ads that have been previously presented on the swipe screen. The history list can be created by adding an ad identifier as well as any additional information to a history store as the ads are presented on the swipe screen. The history list may maintain the ad list in a variety of formats as described above, and the list may comprise a plurality of ads that are retained for a variety of time periods as described above.

In some embodiments, the selection of the ad in step 256 may include a selection from a bookmarked list. The bookmarked list may comprise one or more ads that have been previously presented on the swipe screen and have been selected for inclusion on the bookmarked list. For example, when an ad is presented on the swipe screen, a user may provide an input indicating that the ad should be added to a bookmarked list (e.g., a favorites list). The information for the ad such as an identification for the ad, the time the ad was displayed, etc., may then be added to a bookmarked list. Upon accessing the bookmarked list, the ads that have been bookmarked may be displayed for selection by the user.

At step 258, the ad may be displayed on the swipe screen of the mobile device. The ad may be retrieved from the ad cache based on an ad identifier contained in the list. Once the ad is retrieved, it may be initiated and displayed on the swipe screen. When the list comprises a history list, the list of previously presented ads may comprise the ad identifier. A selection from the list can then be used to identify the ad in the ad cache. Similarly, when the list is a bookmarked list, the ads in the list may comprise an ad identifier. A selection of an ad from the bookmarked list can use the ad identifier in the list to retrieve the ad from the bookmarked list. When an ad is not available in the ad cache, the ad may be requested from a server such as the ad gateway 122, the ad data history 123, or the like. Upon receiving the ad from the server, the ad may be stored in the ad cache 114, initiated, and displayed on the swipe screen display.

At step 260, an interaction report may be generated based on the selection of the ad from the list. The act of selecting the ad from the list may itself be considered an interaction with the ad, regardless of any subsequent inputs received by the mobile device. For example, selecting an ad from a history list may be considered an interaction with the ad. Similarly, selecting an ad to be included on the bookmarked list may be considered an interaction with the ad as well as the subsequent selection of the ad from the bookmarked list. Any additional interactions with the ad may also be recorded and included in the interaction report. Once the interaction report is generated, the interaction report may be sent to a server in step 262.

Figure 5:
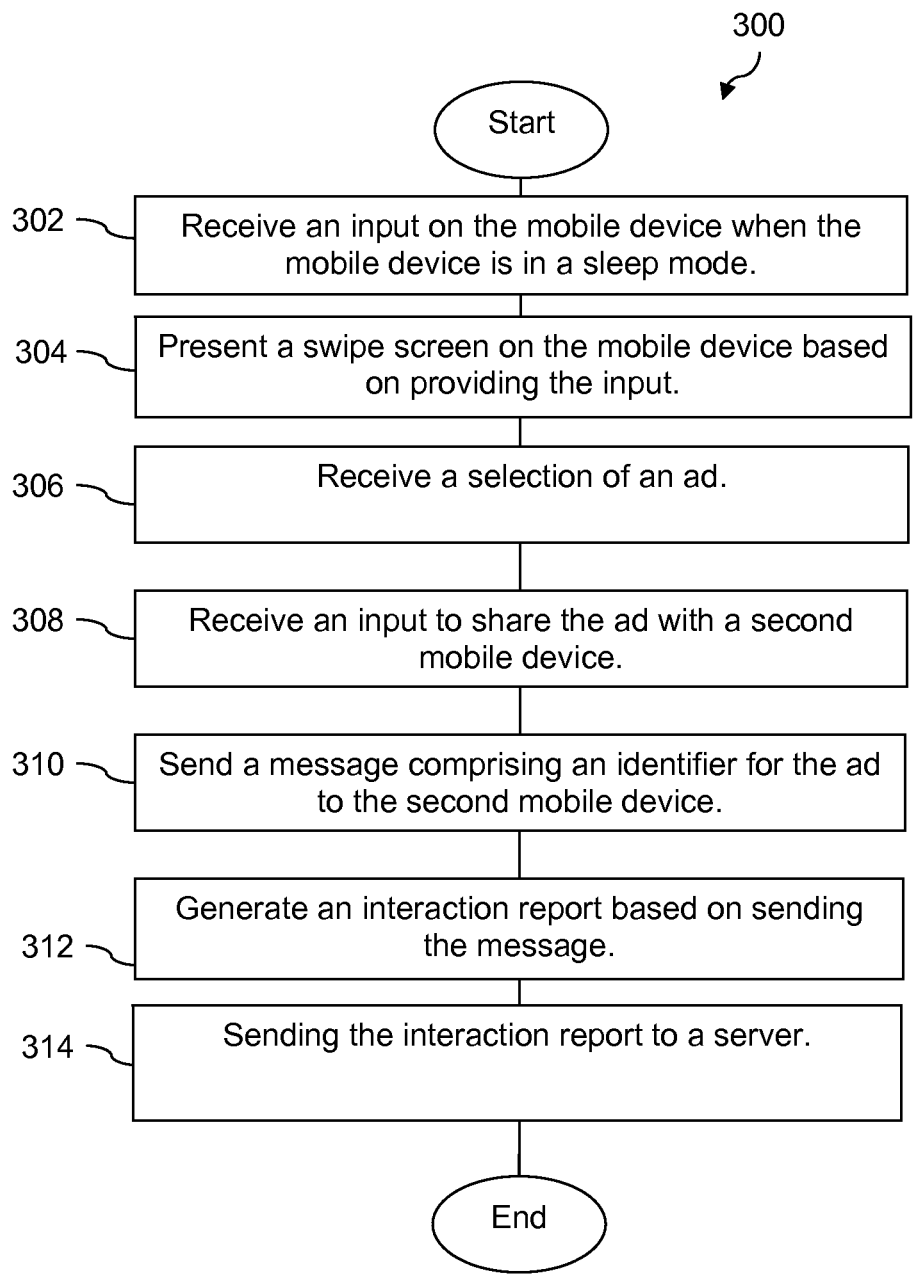
FIG. 5 is a flow chart of still another method according to an embodiment of the disclosure.

Turning now to FIG. 5, a method 300 of interacting with an ad on a swipe screen of a mobile device 101 is described. At step 302, an input can be received on the mobile device 101 when the mobile device 101 is in a sleep mode. The swipe screen can be presented on the mobile device 101 based on providing the input in step 304.

An ad can be selected in step 306, and an input to share the ad with a second mobile device 101 can be received at step 308. Steps 306 and 308 can occur in any order. The ad can be selected in various ways. For example, the selection may be of a currently displayed ad. For example, an ad may be presented on the swipe screen of the mobile device when the swipe screen is activated. The ad that is displayed may be selected for sharing by receiving a selection from a user, which may include a method of sharing the ad, a recipient identification, and the like. In some embodiments, the selection of the ad can occur from a history list and/or a bookmarked list. For example, the ad may be selected from a list, and rather than display the ad, the ad may be shared.

At step 310, a message comprising an identifier for the ad can be sent to the second mobile device. In some embodiments, the message may also comprise an identifier for the user, mobile device, and/or the swipe screen application initiating the request to share the ad. The message may be received by the second mobile device, and in response, the second mobile device may generate a request for the ad to an ad server. The ad may be sent to the second mobile device and displayed on the second mobile device. The ad server may optionally verify that the second mobile device has the swipe screen application. When the second mobile device does not have the swipe screen application, the ad server may transfer the swipe screen application to the second mobile device to allow the ad to be displayed. In order to allow the ad to be displayed on the swipe screen of the second mobile device, the ad may be sent with a highest priority to ensure that the ad is the first ad selected for display.

In an embodiment, sharing may also occur for other portions of the system. For example, the input indicating that the ad should be shared may result in the ad being added to the history list and/or bookmarked list of the second mobile device. This may allow the swipe screen application 110 on the second mobile device to access the ad from the list and display the ad. In some embodiments, the sharing of the items may occur automatically, for example when an ad is included in a history list or bookmarked list of the mobile device 101, it may automatically be shared with the second mobile device.

At step 312, an interaction report may be generated based on the sending the message to the second mobile device. The act of selecting the ad for sharing may itself be considered an interaction with the ad, regardless of any subsequent inputs received by the mobile device 101. For example, selecting a presently displayed ad, and/or selecting an ad from a list may be considered an interaction with the ad. The message sending the ad may also comprise an identifier for the mobile device 101. The downloading of the ad by the second mobile device may result in the identification of the mobile device 101 as the originating source of the ad. The downloading of the ad by the second mobile device can then be seen as an interaction with the ad for both the mobile device and the second mobile device. Moreover, subsequent viewing and/or sharing of the ad can be seen as interactions with the ad for both the mobile device and the second mobile device. Any additional interactions with the ad when the ad is displayed may also be recorded and included in the interaction report. Once the interaction report is generated, the interaction report may be sent to a server in step 262.

Figure 6:
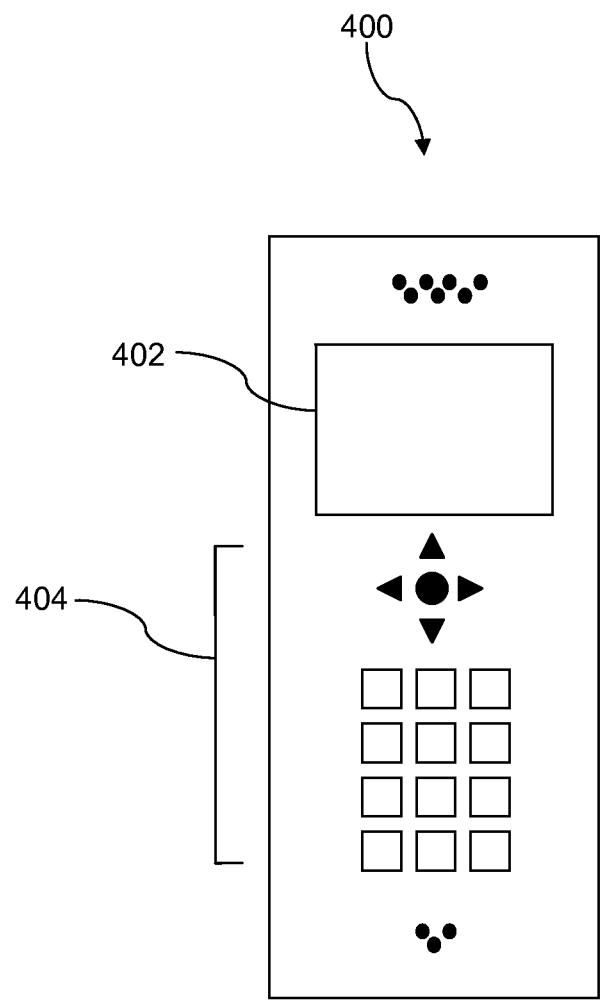
FIG. 6 is an illustration of a mobile device according to an embodiment of the disclosure.

FIG. 6 depicts the mobile device 400, which is operable for implementing aspects of the present disclosure, but the present disclosure should not be limited to these implementations. The mobile device 400 may be used as the mobile device described with respect to FIG. 1 above. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 7:
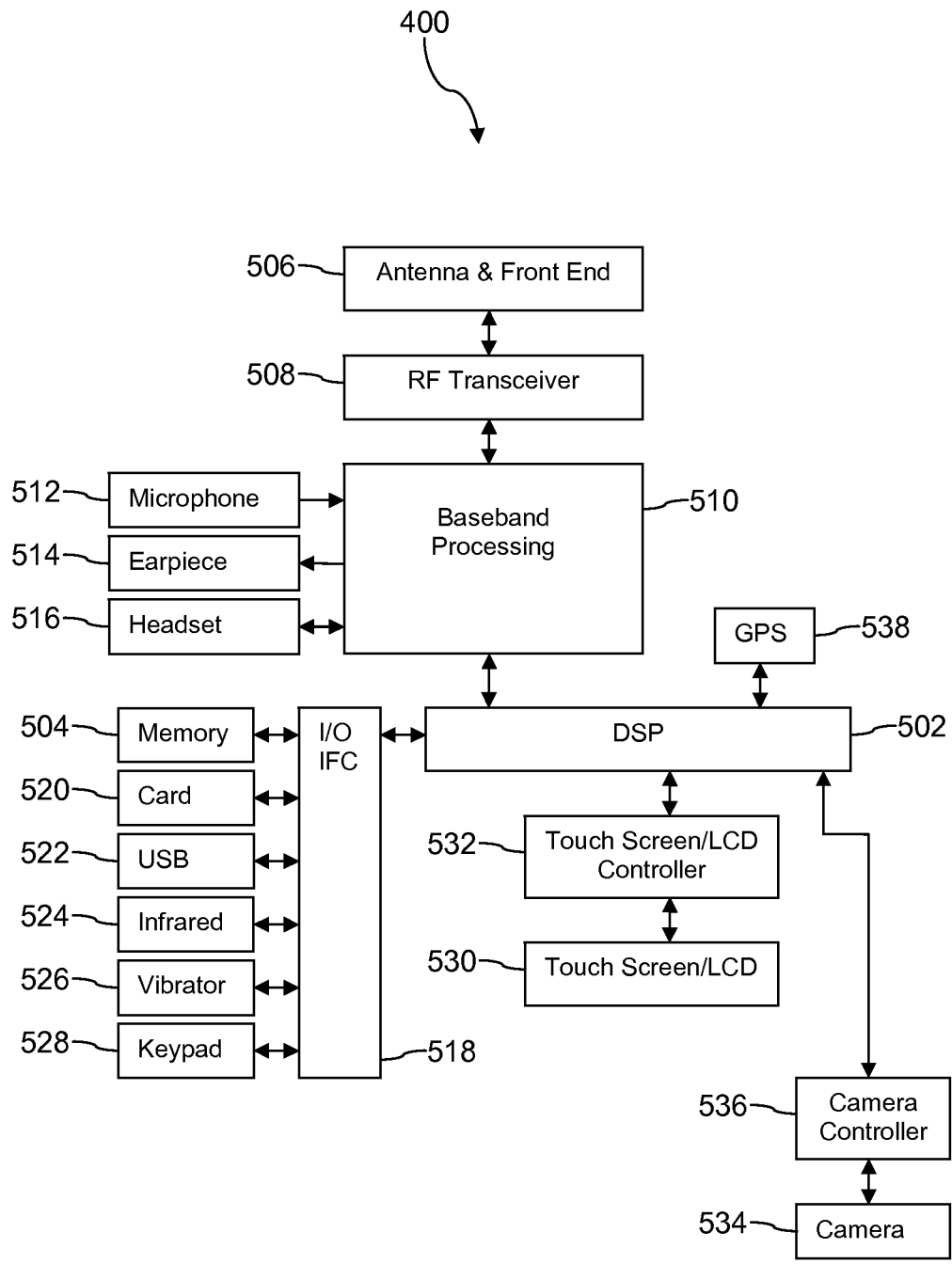
FIG. 7 is a block diagram of a mobile device according to an embodiment of the disclosure.

FIG. 7 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 8A:
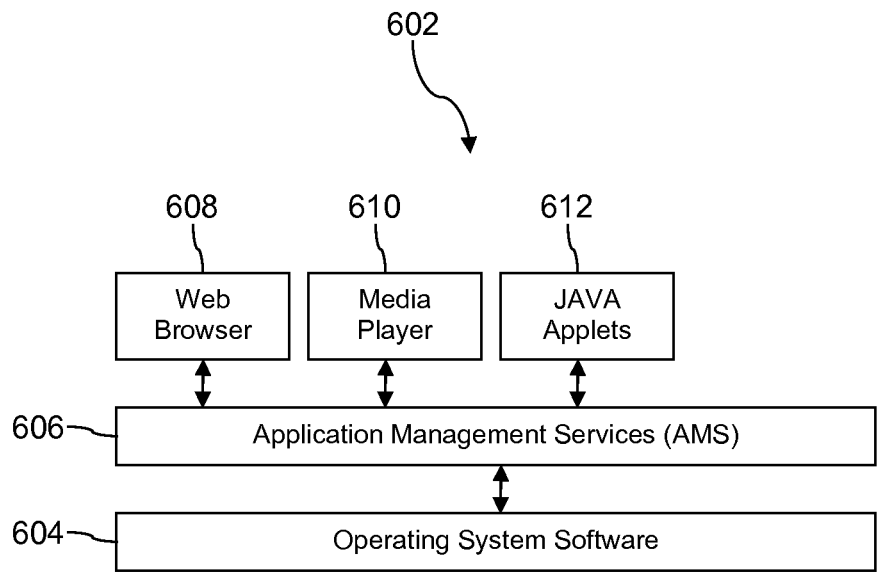
FIGS. 8A and 8B are block diagrams of software architecture for a mobile device according to an embodiment of the disclosure.

FIG. 8A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 8A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 8B:
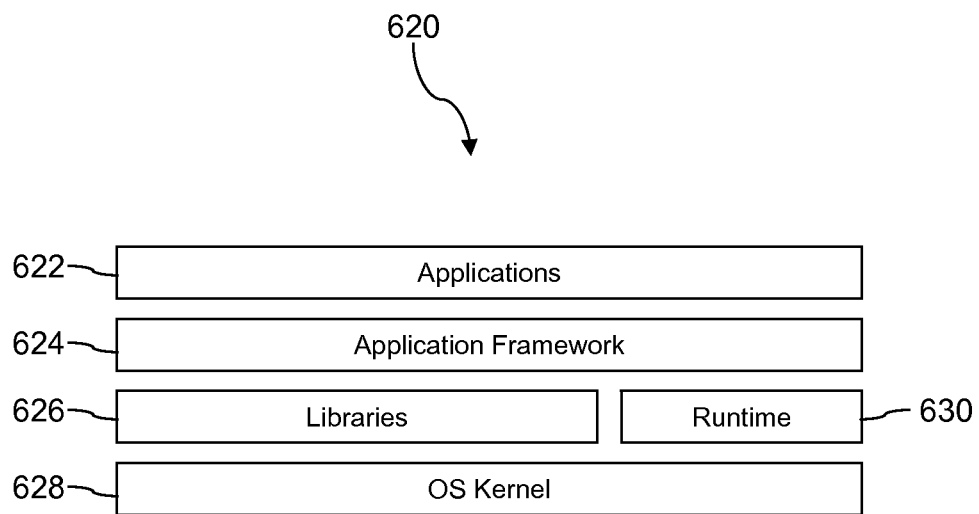

FIG. 8B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 9:
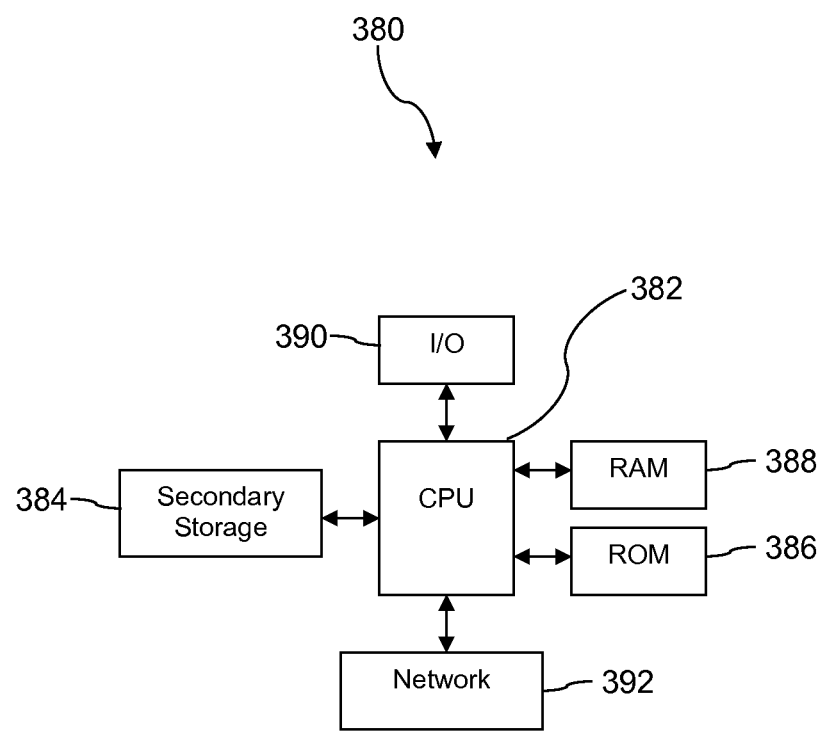
FIG. 9 illustrates an exemplary computer system suitable for implementing the several embodiments of the disclosure.

FIG. 9 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (Wi-MAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

Having described the systems and methods herein, various embodiments may include, but are not limited to:

In a first embodiment, a method of interacting with an ad on a swipe screen of a mobile device comprises receiving an input on the mobile device when the mobile device is in a sleep mode, presenting a swipe screen on the mobile device based on providing the input, displaying an ad on the swipe screen on the mobile device, receiving, by one or more input devices on the mobile device, one or more inputs, wherein the one or more inputs correspond to an interaction with the ad, generating an interaction report based on the one or more inputs, and sending the interaction report to a server. In a second embodiment, the method of the first embodiment may also include providing a gesture input on the mobile device, and presenting at least one of a home screen or a lock screen on the mobile device in response to providing the gesture input. In a third embodiment, the one or more inputs of the second embodiment may comprise the gesture input. In a fourth embodiment, the one or more inputs of the second embodiment may only comprise inputs received between displaying the ad and providing the gesture input. In a fifth embodiment, the method of any of the first to fourth embodiments may also include calculating an interaction score for the one or more inputs. Generating the interaction report may comprise generating the interaction report based on the one or more inputs and the interaction score, and the interaction report may comprise the interaction score. In a sixth embodiment, the method of the fifth embodiment may also include comparing the interaction score with a threshold score. Generating the interaction report may comprise generating the interaction report based on the one or more inputs when the interaction score exceeds the threshold score. In a seventh embodiment, the method of any of the first to sixth embodiments may also include adding information associated with the ad to at least one of a scheduling store or a contact store on the mobile device. In an eighth embodiment, the ad of any of the first to seventh embodiments may be provided by an advertisement provider, and the advertisement provider may be charged for the ad based on the interaction report sent to the server comprising more than a threshold number of inputs.

In an ninth embodiment, a method of interacting with an ad on a swipe screen of a mobile device comprises receiving an input on the mobile device when the mobile device is in a sleep mode, presenting a swipe screen on the mobile device based on providing the input, receiving a selection of an ad from a list, displaying the ad on the swipe screen on the mobile device, generating an interaction report based on receiving the selection of the ad from the list, and sending the interaction report to a server. In a tenth embodiment, the method of the ninth embodiment may also include receiving a second selection of the ad from the list. The interaction report may comprise the second selection of the ad. In an eleventh embodiment, the list of the ninth or tenth embodiment may comprise a history list, and the history list may comprise a plurality of ads that have been previously presented on the swipe screen. In a twelfth embodiment, the history list of the eleventh embodiment may comprise an identifier for each of the plurality of ads, and the method may also include retrieving the ad from an ad cache on the mobile device based on the identifier for the selection of the ad; and initiating the ad on the mobile device. In a thirteenth embodiment, the list of any of the ninth to twelfth embodiments may comprise a bookmarked list, and the bookmarked list comprises one or more ads that have been previously presented on the swipe screen and have been selected for inclusion on the bookmarked list. In a fourteenth embodiment, the method of the thirteenth embodiment may also include presenting the ad on the swipe screen on the mobile device, receiving an input to bookmark the ad when the ad is presented on the swipe screen, and adding the ad to the bookmarked list based on receiving the input. Receiving the selection of the ad may comprise receiving the selection of the ad from the bookmarked list, and displaying the ad on the swipe screen on the mobile device may occur after receiving the selection of the ad from the bookmarked list.

In a fifteenth embodiment, a method of interacting with an ad on a swipe screen of a mobile device comprises receiving an input on the mobile device when the mobile device is in a sleep mode, presenting a swipe screen on the mobile device based on providing the input, displaying an ad on the swipe screen on the mobile device, receiving, by one or more input devices on the mobile device, a request to include information associated with the ad to at least one of a scheduling application or contact application on the mobile device, generating an interaction report based on the request, and sending the interaction report to a server. In a sixteenth embodiment, the information associated with the ad of the fifteenth embodiment may comprise at least one of a phone number, an address, a date, a name, or a schedule. In a seventeenth embodiment, the information associated with the ad of the fifteenth or sixteenth embodiment may not display on the swipe screen on the mobile device. In an eighteenth embodiment, the information of the seventeenth embodiment may be stored in metadata associated with the ad. In a nineteenth embodiment, the method of any of the fifteenth to eighteenth embodiments may also include performing a location determination for the mobile device, selecting the information associated with the ad from a plurality of information associated with the ad based on the location determination, and including the information associated with the ad in the at least one of the schedule application or contact application. In a twentieth embodiment, the method of any of the fifteenth to nineteenth embodiments may also include selecting the information associated with the ad from a plurality of information associated with the ad based on demographic information for a user of the mobile device, and including the information associated with the ad in the at least one of the schedule application or contact application. In a twenty first embodiment, the method of any of the fifteenth to twentieth embodiments may also include receiving a selection of the information from the scheduling application or contact application, tracking the selection on the mobile device, generating a second interaction report based on the tracking, and sending the second interaction report to the server.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of measuring ad performance on a mobile device, the method comprising:

presenting a swipe screen on a mobile device by executing a swipe screen application on the mobile device, wherein the mobile device includes input devices that comprise a touch screen, an accelerometer, a microphone, and a camera, and wherein the swipe screen is configured to be presented to a user subsequent to activating the touch screen of the mobile device from a non-displaying state and prior to the touch screen of the mobile device displaying a home screen or lock screen of the mobile device;

displaying, by executing the swipe screen application on the mobile device, an ad on the swipe screen on the mobile device, wherein the ad is configured to accept an expected range of inputs via the accelerometer and the touch screen corresponding to interactions with the ad while displayed on the swipe screen, and wherein the expected range of inputs are inputs other than interaction inputs that transition the touch screen from presenting the swipe screen to presenting the home screen or lock screen;

receiving, via at least some of the input devices on the mobile device, inputs while displaying the ad on the swipe screen;

in response to receiving the inputs, determining, by executing the swipe screen application on the mobile device, that the inputs fall within the expected range of inputs for the ad via the accelerometer and the touch screen;

in response to determining that the inputs fall within the expected range of inputs for the ad, recording, by executing the swipe screen application on the mobile device, the inputs from the accelerometer and the touch screen as interactions corresponding to the ad displayed on the swipe screen rather than link to another source of content;

generating, by the mobile device, an interaction report for recording the interactions determined to fall within the expected range of inputs for the ad while the ad is displayed on the swipe screen;

calculating an interaction score for the ad displayed on the swipe screen by counting each interaction recorded once and adding together each of the recorded interactions corresponding to the ad being displayed;

comparing the interaction score with a threshold score, wherein the interaction score is included in the interaction report when the interaction score exceeds the threshold score, wherein the threshold score is a threshold quantity of interactions, and wherein the interaction score is not included in the interactions report unless the count of interactions of the interaction score exceeds the threshold quantity of interactions of the threshold score;

identifying, by the mobile device, that the interaction report exceeds a predefined file size;

in response to the interaction report exceeding the predefined file size, sending, from a non-transitory memory of the mobile device storing the interaction report, the interaction report to a server associated with the ad displayed on the swipe screen;

monitoring, by the mobile device, for any input on the swipe screen that falls outside of the expected range and corresponds with an attempt to bypass the ad to reach any of a desktop of the mobile device, a lock screen presented on the mobile device, or an external website via the mobile device; and based on the monitoring, ceasing display of the ad on the swipe screen in response to receiving an input that falls outside the expected range and corresponds with the attempt to bypass the ad to reach any of a desktop of the mobile device, a lock screen presented on the mobile device, or an external website via the mobile device.

2. The method of claim 1, wherein the ad displayed on the swipe screen comprises an identifier and provides the expected range of inputs to the swipe screen application.

3. The method of claim 1, wherein the ad does not provide a link to an external source.

4. The method of claim 1, wherein the inputs only comprise inputs received between displaying the ad and providing a gesture input.

5. The method of claim 1, further comprising: adding information associated with the ad to at least one of a scheduling store or a contact store on the mobile device.

6. The method of claim 1, wherein the ad is provided by an advertisement provider, and wherein the advertisement provider is charged for the ad based on the interaction report sent to the server comprising more than a threshold number of inputs.

7. A method of identifying and retrieving prior displayed content that is not available based on a static location identifier, the method comprising:

receiving, via one or more input devices of a plurality of input devices on a mobile device, an input on the mobile device when the mobile device is in a sleep mode, wherein the input initiates transition of the mobile device to an awake mode, and wherein the plurality of input devices comprises a touch screen, an accelerometer, a microphone, and a camera;

presenting, by executing a swipe screen application on the mobile device, a swipe screen on the mobile device based on transitioning to the awake mode, wherein the swipe screen is configured to be presented to a user immediately subsequent to activating the touch screen of the mobile device from the sleep mode and prior to the touch screen of the mobile device displaying a home screen or lock screen of the mobile device;

receiving, on the mobile device, a selection of an ad from a list for display on the swipe screen, wherein the ad is not available based on a static location identifier;

retrieving, by executing an ad manager on the mobile device, the ad based on the selection from the list, wherein the ad is configured to accept an expected range of inputs via the accelerometer and the touch screen, and wherein the expected range of inputs are inputs other than interaction inputs that transition the touch screen from presenting the swipe screen to presenting the home screen or lock screen;

in response to retrieving, displaying, by executing the swipe screen application on the mobile device, the ad on the swipe screen on the mobile device;

receiving, via at least some of the plurality of input devices on the mobile device, inputs while displaying the ad on the swipe screen;

in response to receiving the inputs, determining, by executing the swipe screen application on the mobile device, that the inputs fall within the expected range of inputs for the ad via the accelerometer and the touch screen;

in response to determining that the inputs fall within the expected range of inputs for the ad, recording, by executing the swipe screen application on the mobile device, the inputs from the accelerometer and the touch screen as interactions corresponding to the displayed ad on the swipe screen rather than link to another source of content;

generating, by the mobile device, an interaction report for recording the interactions determined to fall within the expected range of inputs for the ad while the ad is on the swipe screen;

calculating an interaction score for the ad displayed on the swipe screen by counting each interaction recorded once and adding together each of the recorded interactions corresponding to the ad being displayed;

comparing the interaction score with a threshold score, wherein the interaction score is included in the interaction report when the interaction score exceeds the threshold score, wherein the threshold score is a threshold quantity of interactions, and wherein the interaction score is not included in the interactions report unless the count of interactions of the interaction score exceeds the threshold quantity of interactions of the threshold score;

sending, by the mobile device, the interaction report to a server associated with the ad displayed on the swipe screen;

monitoring, by the mobile device, for any input on the swipe screen that falls outside of the expected range and corresponds with an attempt to bypass the ad to reach any of a desktop of the mobile device, a lock screen presented on the mobile device, or an external website via the mobile device; and based on the monitoring, ceasing display of the ad on the swipe screen in response to receiving an input that falls outside the expected range and corresponds with the attempt to bypass the ad to reach any of a desktop of the mobile device, a lock screen presented on the mobile device, or an external website via the mobile device.

8. The method of claim 7, wherein retrieving the ad comprises retrieving the ad from an ad cache stored on the mobile device.

9. The method of claim 7, wherein the list comprises a history list, and wherein the history list comprises a plurality of ads that have been previously presented on the swipe screen.

10. The method of claim 9, wherein the history list comprises an identifier for each of the plurality of ads, and wherein the method further comprises: retrieving the ad from an ad cache on the mobile device based on the identifier for the selection of the ad; and initiating the ad on the mobile device.

11. The method of claim 7, wherein the list comprises a bookmarked list, and wherein the bookmarked list comprises one or more ads that have been previously presented on the swipe screen and have been selected for inclusion on the bookmarked list.

12. The method of claim 7, further comprising:
determining that an ad cache does not contain the ad;
sending a request for the ad to an advertisement gateway, wherein the request comprises an identifier for the ad;
receiving the ad at the mobile device; and
storing the ad in the ad cache,
wherein retrieving the ad comprises retrieving the ad from the ad cache.

13. A method of interacting with an ad on a swipe screen of a mobile device, the method comprising:
receiving, by a mobile device, an input on the mobile device when the mobile device is in a sleep mode;
presenting, by the mobile device, an ad on the swipe screen of the mobile device based on providing the input, wherein the ad is configured to accept a range of inputs corresponding to interactions with the ad while displayed on the swipe screen including an expected range of inputs via the accelerometer and the touch screen corresponding to interactions with the ad while displayed on the swipe screen, wherein the swipe screen is configured to be presented to a user subsequent to activating the touch screen of the mobile device from the sleep mode and prior to the touch screen of the mobile device displaying a home screen or lock screen of the mobile device, and wherein the expected range of inputs are inputs other than interaction inputs that transition the touch screen from presenting the swipe screen to presenting the home screen or lock screen;
receiving, by the mobile device, a selection of the ad;
receiving, on the mobile device, an input to share the ad with a second mobile device;
sending, by the mobile device, a message comprising an identifier for the ad to the second mobile device;
receiving, via at least some of a plurality of input devices on the mobile device, inputs while displaying the ad on the swipe screen, wherein the plurality of input devices comprises a touch screen, an accelerometer, a microphone, and a camera;
in response to receiving the inputs, determining, by executing a swipe screen application on the mobile device, that the inputs fall within the expected range of inputs for the ad via the accelerometer and the touch screen;
in response to determining that the inputs fall within the expected range of inputs for the ad, recording, by executing the swipe screen application on the mobile device, the inputs from the accelerometer and the touch screen as interactions corresponding to the displayed ad on the swipe screen rather than link to another source of content;
generating, by the mobile device, an interaction report for recording the interactions determined to fall within the expected range of inputs for the ad while the ad is on the swipe screen;
calculating an interaction score for the ad presented on the swipe screen by counting each interaction recorded once and adding together each of the recorded interactions corresponding to the ad being presented;
comparing the interaction score with a threshold score, wherein the interaction score is included in the interaction report when the interaction score exceeds the threshold score, wherein the threshold score is based a threshold quantity of interactions, and wherein the interaction score is not included in the interactions report unless the count of interactions of the interaction score exceeds the threshold quantity of interactions of the threshold score;
sending, by the mobile device, the interaction report to a server associated with the ad displayed on the swipe screen;
monitoring, by the mobile device, for any input on the swipe screen that falls outside of the expected range and corresponds with an attempt to bypass the ad to reach any of a desktop of the mobile device, a lock screen presented on the mobile device, or an external website via the mobile device; and
based on the monitoring, ceasing display of the ad on the swipe screen in response to receiving an input that falls outside the expected range and corresponds with the attempt to bypass the ad to reach any of a desktop of the mobile device, a lock screen presented on the mobile device, or an external website via the mobile device.

14. The method of claim 13, wherein receiving the selection of the ad comprises:
displaying the ad on the swipe screen on the mobile device; and
receiving the selection of the ad while the ad is displayed on the swipe screen on the mobile device.

15. The method of claim 13, wherein receiving the selection of the ad comprises: receiving the selection of the ad from a history list, wherein the history list comprises a plurality of ads that have been previously presented on the swipe screen.

16. The method of claim 13, wherein receiving the selection of the ad comprises: receiving the selection of the ad from a bookmarked list, wherein the bookmarked list comprises a plurality of ads that have been previously presented on the swipe screen and that have been selected for inclusion on the bookmarked list based on a display of the plurality of ads on the swipe screen.

17. The method of claim 13, wherein the message is received by the second mobile device, wherein the second mobile device generates a request to an ad server for the ad based on the message, and wherein the ad is received by the second mobile device, and wherein the ad is displayed on the second mobile device.

18. The method of claim 17, wherein the message further comprises an identifier for the mobile device, wherein a second interaction report is generated when the ad is displayed on the second mobile device, and wherein the second interaction report comprises the identifier for the mobile device.

* * * * *